United States Patent
Obrecht et al.

(10) Patent No.: US 9,034,992 B2
(45) Date of Patent: May 19, 2015

(54) NITRILE RUBBERS WHICH OPTIONALLY CONTAIN ALKYLTHIO TERMINAL GROUPS AND WHICH ARE OPTIONALLY HYDROGENATED

(71) Applicant: LANXESS Deutschland GmbH, Cologne (DE)

(72) Inventors: Werner Obrecht, Moers (DE); Rolf Josten, Neuss (DE); Michael Klimpel, Gambsheim (FR)

(73) Assignee: LANXESS Deutschland GmbH, Cologne (DE)

( * ) Notice: Subject to any disclaimer, the term of this patent is extended or adjusted under 35 U.S.C. 154(b) by 0 days.

(21) Appl. No.: 14/022,890

(22) Filed: Sep. 10, 2013

(65) Prior Publication Data
US 2014/0011915 A1 Jan. 9, 2014

Related U.S. Application Data

(62) Division of application No. 12/864,374, filed as application No. PCT/EP2009/050465 on Jan. 16, 2009, now Pat. No. 8,623,981.

(30) Foreign Application Priority Data

Jan. 29, 2008 (EP) .................... 08150757

(51) Int. Cl.
*C08F 236/12* (2006.01)
*C08F 2/24* (2006.01)
*C08F 8/04* (2006.01)
*C08C 1/15* (2006.01)
*B65D 41/00* (2006.01)
*C08F 8/50* (2006.01)
*B29D 23/00* (2006.01)

(52) U.S. Cl.
CPC .............. *C08C 1/15* (2013.01); *Y10T 428/139* (2015.01); *C08F 236/12* (2013.01); *Y10S 525/94* (2013.01)

(58) Field of Classification Search
USPC ............... 526/224, 338; 525/329.3, 940, 338; 528/488; 523/352; 264/236; 428/36.8
See application file for complete search history.

(56) References Cited

U.S. PATENT DOCUMENTS

| | | | | |
|---|---|---|---|---|
| 4,647,652 A | * | 3/1987 | Eichenauer et al. | 528/486 |
| 5,807,941 A | * | 9/1998 | Tsuji et al. | 526/224 |
| 7,923,518 B2 | * | 4/2011 | Obrecht | 526/224 |
| 2008/0293869 A1 | * | 11/2008 | Obrecht | 524/439 |

* cited by examiner

Primary Examiner — Fred M Teskin

(57) ABSTRACT

An improved polymerization and process method allows the production of special nitrile rubbers which are characterized by a specific anion content and an excellent storage stability and allow a particularly good vulcanization rate and moreover result in vulcanized materials that have advantageous properties, especially with regard to the contact with metal components of molded parts based on said vulcanized materials.

25 Claims, 3 Drawing Sheets

NITRILE RUBBERS WHICH OPTIONALLY CONTAIN ALKYLTHIO TERMINAL GROUPS AND WHICH ARE OPTIONALLY HYDROGENATED

CRESS-REFERENCE TO RELATED APPLICATIONS

This application is a divisional application of U.S. patent application Ser. No. 12/864,374, filed Feb. 9, 2011, granted as U.S. Pat. No. 8,623,981 on Jan. 7, 2014, and which claims the right of priority under 35 U.S.C. §119 (a)-(d) and 35 U.S.C. §365 of International Application No. PCT/EP20091/50465, filed 16 Jan. 2009, which is entitled to the right of priority of European Patent Application No. EP 08150757.6 filed on 29 Jan. 2008, the contents of which are all incorporated herein by reference.

BACKGROUND OF THE INVENTION

The invention relates to a nitrile rubber, a process for producing it, vulcanizable mixtures based on this nitrile rubber, also a process for producing vulcanizates from these mixtures and the vulcanizates obtained in this way.

For the purposes of the present invention, nitrile rubbers, also referred to as "NBRs" for short, are rubbers which are copolymers or terpolymers of at least one α,β-unsaturated nitrile, at least one conjugated diene and optionally one or more further copolymerizable monomers.

Such nitrile rubbers and processes for producing such nitrile rubbers are known, see, for example, W. Hofmann, Rubber Chem. Technol. 36 (1963) 1 and Ullmann's Encyclopedia of Industrial Chemistry, VCH Verlagsgesellschaft, Weinheim, 1993, pp. 255-261.

Nitrile rubbers are used across a very wide variety of fields of application, as for example for seals, hoses, valve seals and damping elements in the automotive sector, and also for hoses, stators and borehole seals in the oil extraction field, and also for numerous components in the aeronautical industry, the electrical industry, mechanical engineering and marine engineering. For different forms of use it is important that the nitrile rubbers have no deleterious effects—such as corrosion, for example—on the components with which they come into contact. This applies particularly to those rubber parts which are in contact or come into contact on the one hand with water, water-containing solvents and fuels, and also water vapour, and, on the other hand, with metals or metal-containing components. Such parts are, in particular, seals, hoses and diaphragms. Corresponding rubber articles are as follows: O-rings and flat seals, cooler hoses, servo control hoses, air conditioner hoses, thermal insulation hoses, and diaphragms for hydro bearings or diaphragm pumps, for example.

NBR is produced by emulsion polymerization, which firstly gives an NBR latex. The NBR solid is isolated from this latex by coagulation. There is a very wide range of variants for carrying out this coagulation. Salts and acids are conventionally used for coagulation. The stated aim is usually to keep the electrolyte amounts as low as possible.

In the coagulation of latices by means of metal salts, it is known that significantly larger amounts of electrolyte are required in the case of monovalent metal ions, e.g. in the form of sodium chloride, than in the case of polyvalent metal ions, e.g. in the form of calcium chloride, magnesium chloride or aluminium sulphate (Kolloid-Z. 54, 154 (1957)). It is also known that the use of polyvalent metal ions leads to "at least some inclusion of the emulsifier in the product" (Houben-Weyl (1961), Methoden der Org. Chemie, Makromolekulare Stoffe 1, p. 484). According to Houben-Weyl (1961), Methoden der Org. Chemie, Makromolekulare Stoffe 1, p. 479, "not only do the electrolytes used have to be very carefully washed out again, but the finished product should also be free of the catalysts and emulsifiers of the process batch. Even small amounts of residual electrolytes give turbid and cloudy pressed and injection-moulded parts, impair the electrical properties and increase the water absorption capacity of the finished product" (citation). More precise details of the type and amount of impurities of such nitrile rubbers and the effect thereof on the properties of nitrile rubber moldings in contact with other components are not given.

DD 154 702 discloses a process for the free-radical copolymerization of butadiene and acrylonitrile in emulsion, which is controlled by means of a specific, advantageously computer-aided metering program for the monomers and the molecular weight regulators, e.g. tert-dodecyl mercaptan, and in which the latices obtained are worked up by coagulation in an acid medium to give the solid rubber. A significant advantage of the process is said to be that the resin soaps and/or fatty acid soaps used as emulsifiers remain in the rubber as a result of the use of acids in the coagulation, i.e. they are not washed out as in the case of other processes. In addition to the advantage of good properties of the NBR, the improvement in the economics of the process and the avoidance of wastewater pollution by washed-out emulsifier are specifically advertised here. It is stated that the butadiene-acrylonitrile copolymers containing 10-30% by weight of acrylonitrile obtained have good elasticity and low-temperature properties combined with an increased swelling resistance and advantageous processability. No details are given about the type and amount of impurities of these nitrile rubbers. In DD 154 702 these are also no details about the metal corrosivity of the vulcanizates produced with these nitrile rubbers.

According to JP 27902/73 (Appl. 69 32,322) the coagulation is carried out with magnesium salts in the presence of amines. The combination of diethylenetriamine and magnesium chloride is used, for example.

DE-A 23 32 096 discloses that rubbers can be precipitated from their aqueous dispersions by means of methylcellulose and a water-soluble alkali metal, alkaline earth metal, aluminium or zinc salt. Preference is given to using sodium chloride as water-soluble salt. It is stated that an advantage of this process is that it gives a coagulum which is virtually completely free of extraneous constituents such as emulsifiers, catalysts residues and the like since these extraneous materials are removed together with the water when the coagulum is separated off and any remaining residues are completely washed out by means of further water. In DE-A 24 25 441, the electrolyte coagulation of rubber latices is carried out using 0.1-10% by weight (based on the rubber) of water-soluble $C_2$-$C_4$ alkylcelluloses or hydroxyalkylcelluloses in combination with from 0.02 to 10% by weight (based on the rubber) of a water-soluble alkali metal, alkaline earth metal, aluminium or zinc salt as auxiliary instead of methylcellulose. Here too, preference is given to using sodium chloride as water-soluble salt. The coagulum is separated off mechanically, optionally washed with water and the remaining water is removed. Here too, it is stated that the extraneous materials are, as in DE-A 23 32 096, essentially completely removed together with the water when the coagulum is separated off and any remaining residues are washed out completely in the washing with further water. No details are given about the residual amounts of the impurities in these nitrile rubbers.

Furthermore, neither DE-A 23 32 096 nor DE-A 24 25 441 gives details about the effects of some impurities on the property of the metal corrosivity of the vulcanizates produced with these nitrile rubbers.

U.S. Pat. No. 5,708,132 describes a process for working up nitrile rubber latices, which displays improved storage stability (70° C./28 days) and a higher full vulcanization rate (TC90). Mixtures of salts and acids, in particular sulphuric acid, are used for coagulation of the latex. The process is characterized by maintenance of a narrow pH range in the washing of the crumb, with the pH of the washing water being in the range from 5 to 8, preferably from 5.5 to 7.5, particularly preferably from 6 to 7. Calcium hydroxide, magnesium hydroxide and sodium hydroxide are used for adjusting the pH, with the use of sodium hydroxide being preferred. An ageing inhibitor based on alkylated aryl phosphites, in particular alkylated aryl phosphites in combination with sterically hindered phenols, is used for stabilizing the nitrile rubber. After washing, the rubber crumb is dewatered in a screw apparatus to residual moisture contents of from 7 to 10% by weight and subsequently dried thermally.

In DE-A 27 51 786, it is established that the precipitation and isolation of rubbers from their aqueous dispersions can be carried out by means of a smaller amount of (hydroxy)alkylcellulose when from 0.02 to 0.25% by weight of a water-soluble calcium salt is used. A further advantage is said to be that this process gives an extremely pure coagulum which is essentially completely free of extraneous constituents such as emulsifiers, catalysts residues and the like. These extraneous materials are removed together with the water when the coagulum is separated off and any remaining residues can be washed out by means of water. It is also stated that the properties of the isolated rubbers are not adversely affected by a calcium salt being used for coagulation. Rather, it is said that a rubber whose vulcanizate properties are not impaired and are fully satisfactory is obtained. This is presented as surprising since it is said that impairment of the rubber properties is frequently observed when polymers are precipitated from dispersions by means of polyvalent metal ions such as calcium or aluminium ions. Houben-Weyl (1961), Methoden der Org. Chemie, Makromolekulare Stoffe 1, pp. 484/485, is offered as evidence for the last statement. In contrast, the rubbers of DE-A 27 51 786 display no slowing or worsening of, for example, the initial vulcanization and/or full vulcanization. No details are given about the residual amounts of the impurities in these nitrile rubbers. DE-A 27 51 786 likewise does not give any information about the possible effects of such impurities.

As in the case of the above-described patents, the object of DE-A 30 43 688, is also to achieve a large reduction in the amounts of electrolyte required for coagulation of the latex. According to the teachings of DE-A 3043 688, this is achieved by using either plant-based protein-like materials or polysaccharides such as starch and if appropriate water-soluble polyamine compounds as auxiliaries in addition to the inorganic coagulate in the electrolyte coagulation of latices. As inorganic coagulates, preference is given to alkali metal or alkaline earth metal salts. The specific additives make it possible to achieve a reduction in the amounts of salts used for quantitative coagulation of the latex. No details are given about the residual amounts of the impurities in these nitrile rubbers. Furthermore, there are no details about the effects of such impurities in vulcanizates based on these nitrile rubbers.

According to U.S. Pat. No. 2,487,263, the coagulation of the latex of styrene-butadiene rubbers is not carried out using metal salts but by means of a combination of sulphuric acid with gelatin ("glue"). The amount and concentration of the sulphuric acid are selected so that the pH of the aqueous medium is set to a value of <6. It is stated that it is advantageous for discrete rubber crumbs which are not coherent and can readily be filtered off and can readily be washed to be formed in the coagulation of the latex. Styrene-butadiene rubber obtained according to the teaching of U.S. Pat. No. 2,487,263 has a lower water absorption capacity, a lower ash content and a higher electrical resistance than rubbers coagulated by means of salts without the addition of gelatin. U.S. Pat. No. 2,487,263 does not disclose what effects the coagulation using sulphuric acid and gelatin has on storage stability, vulcanization rate and vulcanizate properties, and in particular the modulus, of rubbers and makes no disclosure on the question of the metal corrosivity of corresponding vulcanizates.

In U.S. Pat. No. 4,920,176, it is stated and evidenced by experimental data that very high sodium, potassium and calcium contents and also considerable amounts of emulsifier remain in the nitrile rubber in coagulation of a nitrile rubber latex according to the prior art using inorganic salts such as sodium chloride or calcium chloride. This is undesirable and, according to U.S. Pat. No. 4,920,176, water-soluble cationic polymers are used instead of inorganic salts in the coagulation of nitrile rubber latices for the purpose of obtaining an extremely pure nitrile rubber. The said water-soluble cationic polymers are, for example, ones based on epichlorohydrin and dimethylamine. The vulcanizates obtained therefrom display lower swelling on storage in water and an increased electrical resistance. In the patent text, the property improvements mentioned are attributed purely qualitatively to the minimal cation contents remaining in the product. A more detailed explanation of the phenomena observed is not given.

The objective of EP-A-1 369 436 is to provide nitrile rubbers having a high purity. In order to produce the nitrile rubbers, the emulsion polymerization is carried out in the presence of fatty acid and/or resin acid salts as emulsifiers, then coagulation of the latex is carried out by means of addition of acids with pH values of 6 or less, optionally with addition of precipitants. As acids, it is possible to use all mineral and organic acids which allow the desired pH values to be set. As additional precipitant, it is possible to use, for example, alkali metal salts of inorganic acids. Furthermore, it is mentioned but not demonstrated experimentally that precipitation auxiliaries such as gelatin, polyvinyl alcohol, cellulose, carboxylated cellulose and cationic and anionic polyelectrolytes or mixtures thereof can also be added. The fatty and resin acids formed here are subsequently washed out by means of aqueous alkali metal hydroxide solutions and the polymer is finally subjected to shear until a residual moisture content of less than 20% is obtained. This results in nitrile rubbers having very low residue emulsifier contents and low cation contents (sodium, potassium, magnesium and calcium contents). The chloride contents of the nitrile rubbers described in the two examples are 90 ppm and 111 ppm. EP-A-1 369 436 gives no information on the desired production of nitrile rubbers. In particular, EP-A-1 369 436 does not give any indication of what factors influence the vulcanization rate and the property profile of the associated vulcanizates, in particular the metal corrosivity thereof.

EP-A-0 692 496, EP-A-0 779 301 and EP-A-0 779 300 in each case describe nitrile rubbers based on an unsaturated nitrile and a conjugated diene. All the nitrile rubbers contain 10-60% by weight of unsaturated nitrile and have a Mooney viscosity in the range 15-150 or, according to EP-A-0 692 496, in the range 15-65 and all have at least 0.03 mol of $C_{12}$-$C_{16}$-alkylthio group per 100 mol of monomer units, with this alkylthio group having at least three tertiary carbon atoms and a sulphur atom which is bound directly to at least one of the tertiary carbon atoms.

The nitrile rubbers are in each case produced in the presence of a $C_{12}$-$C_{16}$-alkyl thiol having a corresponding structure as molecular weight regulator which functions as "chain transfer agent" and is thus incorporated as end group into the polymer chains.

In the case of the nitrile rubbers of EP-A-0 779 300, it is stated that they have a width "ΔAN" (AN=acrylonitrile) of the composition distribution of the unsaturated nitrile in the copolymer in the range from 3 to 20. The process for producing them differs from that of EP-A-0 692 496 in that only 30-80% by weight of the total amount of monomers is used at the beginning of the polymerization and the remaining amount of monomers is fed in only at a conversion of the polymerization of 20-70% by weight.

In the case of the nitrile rubbers of EP-A-0 779 301, it is stated that they contain 3-20% by weight of a fraction having a low molecular weight and a number average molecular weight $M_n$ of less than 35 000. The process for producing them differs from that of EP-A-0 692 496 in that only 10-95% by weight of the alkyl thiol are mixed into the monomer mixture before the polymerization and the remaining amount of the alkyl thiol is fed in only after a polymerization conversion of 20-70% by weight has been reached.

With regard to the coagulation of the latex, all three patent applications EP-A-0 692 496, EP-A-0 779 301 and EP-A-0 779 300 state that any coagulants can be used. As inorganic coagulants, calcium chloride and aluminium chloride are mentioned and used. According to EP-A-0 779 301 and EP-A-0 779 300, one preferred embodiment consists in a nitrile rubber which is substantially halogen-free and is obtained by carrying out latex coagulation in the presence of a nonionic surface-active auxiliary and using halogen-free metal salts such as aluminium sulphate, magnesium sulphate and sodium sulphate. Preference is said to be given to coagulation using aluminium sulphate or magnesium sulphate, in order to obtain the substantially halogen-free nitrile rubber. The nitrile rubber produced in this way in the examples possesses a halogen content of not more than 3 ppm. It is shown that a nitrile rubber of this kind with 3 ppm of chloride yields a vulcanizate with low metal corrosivity. As far as the production of nitrile rubbers with higher chloride contents, and the metal corrosivity of vulcanizates produced from them, are concerned, no statement is made.

According to EP-A-0 692 496, EP-A-0 779 300 and EP-A-0 779 301, it is essential to use alkyl thiols in the form of the compounds 2,2,4,6,6-pentamethylheptane-4-thiol and 2,2,4,6,6,8,8-heptamethylnonane-4-thiol as molecular weight regulators for the production of the nitrile rubbers. It is pointed out that the use of the conventional tert-dodecyl mercaptan as regulator gives nitrile rubbers having poorer properties.

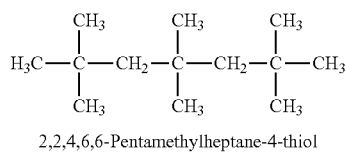

2,2,4,6,6-Pentamethylheptane-4-thiol

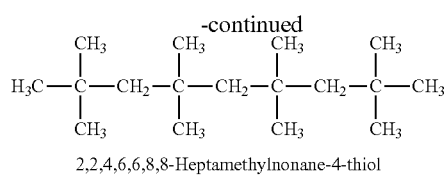

2,2,4,6,6,8,8-Heptamethylnonane-4-thiol

In the case of the nitrile rubbers produced in EP-A-0 692 496, EP-A-0 779 300 and EP-A-0 779 301, it is stated that they have an advantageous property profile, good processability of the rubber mixtures and make low fouling of the mould possible during processing. The vulcanizates obtained are said to have a good combination of low-temperature resistance and oil resistance and possess good mechanical properties. It is also stated that high polymerization conversions of greater than 75%, preferably greater than 80%, in the production of the nitrile rubbers enable a high productivity to be achieved and the vulcanization rate in vulcanization using sulphur or peroxides is high, in particular in the case of NBR grades for injection moulding. It is also indicated that the nitrile rubbers have a short initial vulcanization time and a high crosslinking density. As evidence of the rapid vulcanization of the nitrile rubbers produced according to EP-A-0 692 496, EP-A-0 779 300 and EP-A-0 779 301, the initial vulcanization time (known as the "scorch time" (measured as "Ts")) is presented, although this is merely a measure of the initial vulcanization rate.

On this subject, EP-A-0 692 496 indicates, inter alia, that many methods have already been proposed for setting high vulcanization rates, e.g. the use of minimal amounts of emulsifiers and precipitants, so that only minimal amounts of emulsifiers and precipitants remain in the NBR.

DE 10 2007 024011 describes a rapidly vulcanizing nitrile rubber having good mechanical properties, in particular a high modulus 300 value, which has an ion index ("II") according to the general formula (I) in the range from 7 to 26 ppm×mol/g. The ion index is defined as follows:

$$\text{ion index} = \frac{3c(Ca^{2+})}{40 \text{ g/mol}} - \left[ \frac{c(Na^+)}{23 \text{ g/mol}} + \frac{c(K^+)}{39 \text{ g/mol}} \right] \quad (I)$$

where $c(Ca^{2+*})$, $c(Na^+)$ and $c(K^+)$ indicate the concentrations of the calcium, sodium and potassium ions in the nitrile rubber in ppm. The nitrile rubbers produced according to the invention which are mentioned in the examples have Ca ion contents in the range 325-620 ppm and Mg ion contents in the range 14-22 ppm. The nitrile rubbers which are not according to the invention in the examples have Ca ion contents in the range 540-1290 ppm and Mg ion contents of 2-34 ppm. To obtain such a rapidly vulcanizing nitrile rubber, the coagulation is carried out in the presence of a salt of a monovalent metal and optionally a maximum of 5% by weight of a salt of a divalent metal and the temperature during coagulation and subsequent washing is at least 50° C. DE 102007024011 does not contain any details about any possible metal corrosivity of the vulcanizates produced from these nitrile rubbers.

DE 10 2007 024008 describes a particularly storage-stable nitrile rubber which contains 2,2,4,6,6-pentamethylheptane-4-thio and/or 2,4,4,6,6-pentamethylheptane-2-thio and/or 2,3,4,6,6-pentamethylheptane-2-thio and/or 2,3,4,6,6-pentamethylheptane-3-thio end groups and has a calcium ion content of at least 150 ppm, preferably ≥200 ppm based on the nitrite rubber and a chlorine content of at least 40 ppm, based on the nitrile rubber. The Ca ion contents of the nitrile rubbers produced in the examples according to the invention are 171-1930 ppm and the Mg contents are 2-265 ppm. The Ca ion contents of the comparative examples which are not according to the invention are 2-25 ppm, and the Mg ion contents are 225-350 ppm. Such a storage-stable nitrile rubber is obtained when the coagulation of the latex is carried out in the presence of at least one salt based on aluminium, calcium, magnesium, potassium, sodium or lithium and the coagulation or washing is carried out in the presence of a Ca salt or of washing water containing Ca ions and in the presence of a Cl-containing salt. The chlorine contents of the examples according to the invention are situated in the 49 to 970 ppm range, and those of the non-inventive, comparative examples are situated in the 25 to 39 ppm range. The lower chlorine contents, at 25 to 30 ppm, are obtained only, however, when coagulation takes place with chloride-free precipitants such as magnesium sulphate, aluminium sulphate or potassium aluminium sulphate and is followed by washing with deionized water. DE 102007024008 says nothing about the metal corrosivity of these kinds of NBR vulcanizates.

DE 10 2007 024010 describes a further fast-vulcanizing nitrile rubber which has an ion index ("II") according to the general formula (I) in the range 0-60 ppm×mol/g, preferably 10-25 ppm×mol/g, $$II = 3\left[\frac{c(Ca^{2+})}{40 \text{ g/mol}} + \frac{c(Mg^{2+})}{24 \text{ g/mol}}\right] - \left[\frac{c(Na^+)}{23 \text{ g/mol}} + \frac{c(K^+)}{39 \text{ g/mol}}\right] \quad (I)$$

where $c(Ca^{2+})$, $c(Mg^{2+})$, $c(Na^+)$, and $c(K^+)$ indicate the concentration of the calcium, magnesium, sodium and potassium ions in the nitrile rubber in ppm, and has an Mg ion content of 50-250 ppm based on the nitrite rubber. In the examples for the nitrile rubbers produced according to the invention, the Ca ion content $c(Ca^{2+})$ is in the range 163-575 ppm and the Mg ion content $c(Mg^{2+})$ is in the range 57-64 ppm. In the examples for nitrite rubbers which are not according to the invention, the Ca ion content $c(Ca^{2+})$ is in the range 345-1290 ppm and the Mg ion content $c(Mg^{2+})$ is in the range 2-440 ppm. Such nitrile rubbers are obtained if the coagulation of the latex is carried out with adherence to particular measures and the latex is set to a temperature of less than 45° C. before coagulation using a magnesium salt. DE 102007024010 does not contain any details about the chlorine contents of the nitrile rubbers resulting in this process and about the metal corrosivity of vulcanizates produced therefrom.

SUMMARY OF THE INVENTION

Owing to the high demand for sealing materials based on synthetic rubbers, it was therefore an object of the present invention to provide nitrile rubbers, the vulcanizates of which have extremely low corrosivity and are thus suitable for producing seals of any type, and furthermore to develop a novel process for the purpose of reliably producing such nitrile rubbers, which process permits the coagulation of nitrite rubber latices using small amounts of precipitant so that quantitative precipitation of the latex without fines occurs (i.e. to give a clear serum). The aim was, at the same time, for no excessively large rubber crumbs (without latex or precipitant inclusions) to be formed here and the emulsifier residues remaining in the product to be low (equivalent to a high COD burden in the latex serum and in the wastewater). In addition, the intention was for the nitrile rubbers to have good storage stability as well as low corrosivity and to have a vulcanization rate, in particular low differences between full vulcanization rate and initial vulcanization rate $(t_{90}-t_{10})$, and to lead to vulcanizates having a storage stability of mechanical properties.

It has surprisingly been found that nitrile rubbers having good storage stability and at the same time a high vulcanization rate $(t_{90}-t_{10})$ and also very good vulcanizate properties and a low metal corrosivity are obtained when they have a specific chlorine content.

The present invention accordingly provides a nitrile rubber which contains repeating units of at least one α,β-unsaturated nitrile, at least one conjugated diene and optionally one or more further copolymerizable monomers and has a chlorine content in the range from 4 to 25 ppm, preferably 5 to 23 ppm based on the nitrile rubber.

Such nitrile rubbers have not been known hitherto from the prior art.

DETAILED DESCRIPTION OF THE INVENTION

Figure 1:
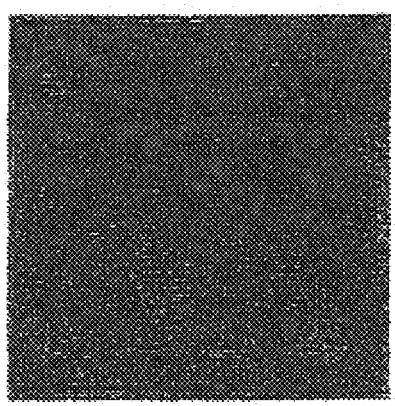
FIG. 1 illustrates the experiment without a sealing ring with the surface of the aluminium having no discoloration perceptible.
Figure 2:
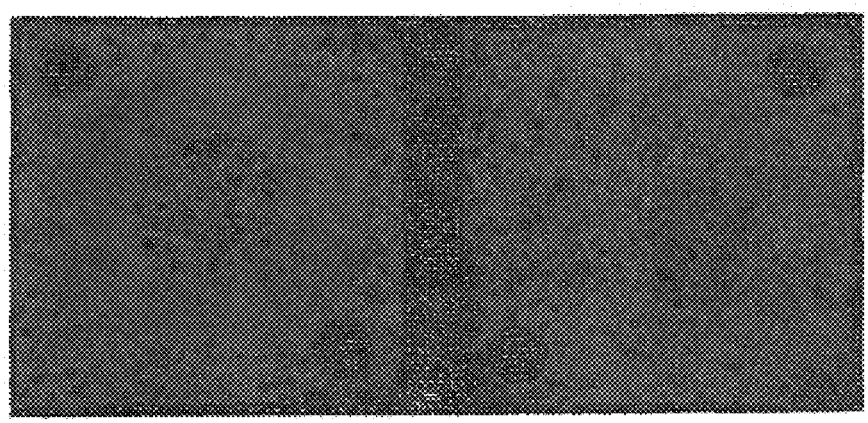
FIG. 2 illustrates the sealing ring with a rating of 2 having a slight discoloration on the surface of the aluminium.
Figure 3:
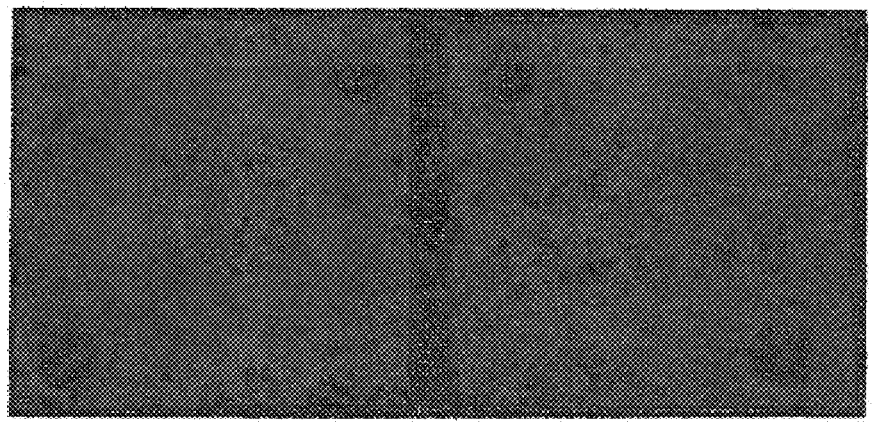
FIG. 3 illustrates the sealing ring with a rating of 3 having a discoloration on the surface of the aluminium.
Figure 4:
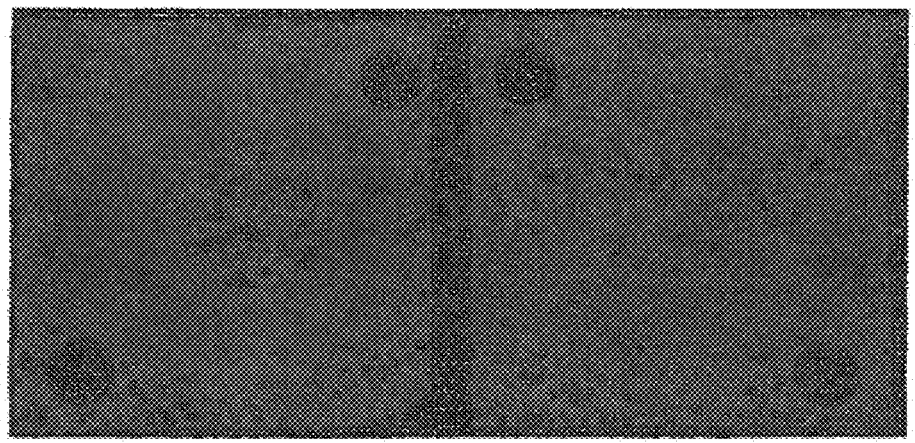
FIG. 4 illustrates the sealing ring with a rating of 4 having a discoloration on the surface of the aluminium with continuous contours for both the outer and inner edges of the sealing ring.
Figure 5:
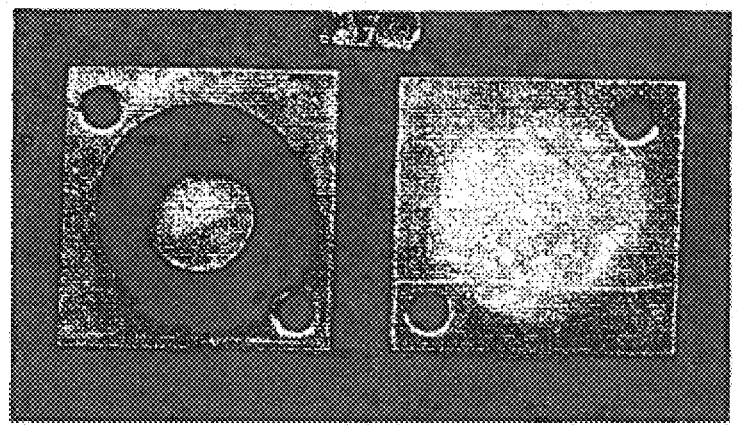
FIG. 5 illustrates the sealing ring with a rating of 5 leaving continuous contours on the surface of the aluminium, for both the inner and outer edges of the sealing ring.

Chlorine Content of the Inventive Nitrile Rubber

The chlorine content of the nitrile rubbers of the invention is determined as follows, in a method based on DIN EN 14582, method A: the nitrile rubber sample in question is digested in a melt of sodium peroxide and potassium nitrate in a Parr pressure vessel. The resultant melt is admixed with sulphite solution and acidified with sulphuric acid. In the solution obtained, the chloride formed is determined by potentiometric titration with silver nitrate solution, and calculated as chlorine.

Storage Stability of the nitrile Robber of the Invention:

The nitrile rubbers of the invention advantageously have a very good storage stability.

For the purposes of the present invention, storage stability of a rubber refers to a very constant molecular weight or Mooney viscosity over a relatively long period of time, in particular also at elevated temperatures.

The storage stability is usually determined by storing the unvulcanized nitrile rubber for a defined period of time at elevated temperature (also referred to as hot air storage) and determining the difference in the Mooney viscosities before and after this storage at elevated temperature. Since the Mooney viscosity of nitrile rubber usually increases on hot air storage, the characterization of the storage stability is carried out by the difference in Mooney viscosity after storage minus Mooney viscosity before storage.

The storage stability SS is thus given by the formula (II)

$$SS = MV2 - MV1 \quad (II)$$

where
MV1 is the value of the Mooney viscosity of a nitrile rubber and
MV2 is the value of the Mooney viscosity of the same nitrile rubber after storage for 48 hours at 100° C.

The determination of the values of the Mooney viscosity (ML 1+4@100° C.) is in each case carried out by means of a shear disc viscometer in accordance with DIN 53523/3 or ASTM D 1646 at 100° C.

It has been found to be useful to carry out the 48 hour storage of the nitrite rubber of the invention at 100° C. in a convection drying oven in which the oxygen content is unchanged compared to normal air.

A nitrile rubber is sufficiently stable on storage when the storage stability SS is not more than 5 Mooney units. The SS is preferably less than 5 Mooney units, particularly preferably not more than 4 Mooney units.

Low Level of Impurities in the Nitrile Rubber of the Invention:

In addition to excellent storage stability, the nitrile rubbers of the invention also have only a few impurities, in particular of the emulsifier used in the polymerization, which is reflected in high COD values for the latex serum, which is produced on coagulation of the latex, and for the washing water.

The amount of emulsifier remaining in the nitrile rubber is determined indirectly by determination of the soluble organic constituents present in the aqueous phase after coagulation of the latex. The measure used for this is the COD (chemical oxygen demand) in accordance with DIN 38 409, part 41, H 41-1 and H 41-2 of the latex serum. In the COD determination, organic constituents are oxidized quantitatively by means of potassium dichromate strongly acidified with sulphuric acid in the presence of a silver sulphate catalyst. The amount of unreacted potassium dichromate is subsequently backtitrated with iron(II) ions. The COD is reported in $mg_{oxygen}$/liters of solution or $g_{oxygen}$/liters of solution in the DIN standard. To improve comparability of experiments in which latices having different solids concentrations or different volumes of precipitants are used, the COD of the serum is divided by the mass of the nitrile rubber. In this case, the COD has the dimensions $g_{oxygen}/kg_{NBR}$. This value is obtained in the following way:

$$COD_{NBR} = \frac{COD_{serum} \times (m_{serum} + m_{pr})}{m_{NBR}}$$

$$COD_{NBR} = \frac{COD_{serum} \times (1 - SC/100 + m_{pr})}{SC/100}$$

where:
$COD_{NBR}$: COD based on 1 kg of NBR ($g_{oxygen}/kg_{NBR}$)
$COD_{serum}$: COD of the serum (determined experimentally) [$g_{oxygen}/kg_{serum}$]
$m_{serum}$: mass of the serum in 1 kg of latex [kg]
$m_{pr}$: mass of the precipitant used [kg/kg]
$m_{NBR}$: mass of the nitrile rubber in 1 kg of latex [kg]
SC: solids content of the latex (% by weight)

The COD is a measure of the amount of low molecular weight constituents, in particular the emulsifiers used in the polymerization, present in the latex serum after coagulation of the latex. The higher the COD based on NBR in coagulation experiments starting out from identical latices, the lower the content of emulsifiers and other impurities in the nitrile rubber.

Nitrile Rubber Latex:

The nitrile rubber latex on which the nitrile rubber of the invention is based is typically obtained by emulsion polymerization. It is the latex of a nitrile rubber having repeating units of at least one α,β-unsaturated nitrile, at least one conjugated diene and optionally one or more further copolymerizable monomers.

The conjugated diene can have any nature. Preference is given to using ($C_4$-$C_6$)-conjugated dienes. Particular preference is given to 1,3-butadiene, isoprene, 2,3-dimethylbutadiene, piperylene, 1,3-pentadiene or mixtures thereof. In particular, 1,3-butadiene or isoprene or mixtures thereof are used. Very particular preference is given to 1,3-butadiene.

As α,β-unsaturated nitrile, it is possible to use any known α,β-unsaturated nitrile; preference is given to ($C_3$-$C_5$)-α,β-unsaturated nitriles such as acrylonitrile, methacrylonitrile, 1-chloroacrylonitrile, ethacrylonitrile or mixtures thereof. Particular preference is given to acrylonitrile.

A particularly preferred nitrile rubber is thus a copolymer of acrylonitrile and 1,3-butadiene.

Apart from the conjugated diene and the α,β-unsaturated nitrile, one or more further copolymerizable monomers known to the person skilled in the art, e.g. α,β-unsaturated monocarboxylic or dicarboxylic acids, their esters or amides, can be additionally used.

As α,β-unsaturated monocarboxylic or dicarboxylic acids, it is possible to use, for example, fumaric acid, maleic acid, acrylic acid, methacrylic acid, crotonic acid and itaconic acid. Preference is given to maleic acid, acrylic acid, methacrylic acid and itaconic acid. Such nitrile rubbers are customarily also abbreviated to carboxylated nitrile rubbers, or "XNBRs" for short.

As esters of α,β-unsaturated carboxylic acids, use is made of, for example, alkyl esters, alkoxyalkyl esters, hydroxyalkyl esters or mixtures thereof.

Particularly preferred alkyl esters of α,β-unsaturated carboxylic acids are methyl (meth)acrylate, ethyl (meth)acrylate, propyl (meth)acrylate, n-butyl (meth)acrylate, t-butyl (meth)acrylate, hexyl (meth)acrylate, 2-ethylhexyl (meth)acrylate, octyl (meth)acrylate and lauryl (meth)acrylate. In particular, n-butyl acrylate is used.

Particularly preferred alkoxyalkyl esters of α,β-unsaturated carboxylic acids are methoxyethyl (meth)acrylate, ethoxyethyl (meth)acrylate and methoxyethyl (meth)acrylate. In particular, methoxyethyl acrylate is used.

Particularly preferred hydroxyalkyl esters of α,β-unsaturated carboxylic acids are hydroxyethyl (meth)acrylate, hydroxypropyl (meth)acrylate and hydroxybutyl (meth)acrylate.

Further esters of α,β-unsaturated carboxylic acids which can be used are, for example, polyethylene glycol (meth)acrylate, polypropylene glycol (meth)acrylate, glycidyl (meth)acrylate, epoxy (meth)acrylate and urethane (meth)acrylate.

Further possible monomers are vinylaromatics such as styrene, α-methylstyrene and vinylpyridine.

The proportions of conjugated diene and α,β-unsaturated nitrile in the nitrile rubbers of the invention can vary within a wide range. The proportion of the conjugated diene or of the sum of conjugated dienes is usually in the range from 20 to 95% by weight, preferably in the range from 40 to 90% by weight, particularly preferably in the range from 60 to 85% by weight, based on the total polymer. The proportion of the op-unsaturated nitrile or of the sum of α,β-unsaturated nitriles is usually from 5 to 80% by weight, preferably from 10 to 60% by weight, particularly preferably from 15 to 40% by weight, based on the total polymer. The proportions of the monomers in each case add up to 100% by weight.

The additional monomers can be present in amounts of from 0 to 40% by weight, preferably from 0.1 to 40% by weight, particularly preferably from 1 to 30% by weight, based on the total polymer. In this case, corresponding proportions of the conjugated diene or dienes and/or of the α,β-unsaturated nitrile or nitriles are replaced by proportions of these additional monomers, with the proportions of all monomers continuing to add up to 100% by weight.

If esters of (meth)acrylic acid are used as additional monomers, they are usually used in amounts of from 1 to 25% by weight.

If α,β-unsaturated monocarboxylic or dicarboxylic acids are used as additional monomers, they are usually used in amounts of less than 10% by weight.

The nitrogen content of the nitrile rubbers of the invention is determined by the Kjeldahl method in accordance with DIN 53 625. Owing to the content of polar comonomers, the nitrile rubbers are usually soluble in methyl ethyl ketone to an extent of ≥85% by weight at 20° C.

The nitrile rubbers have Mooney viscosities (ML (1+4 @100° C.)) of from 10 to 150, preferably from 20 to 100, Mooney units. The Mooney viscosity (ML (1+4 @100° C.)) is determined at 100° C. by means of a shear disc viscosimeter in accordance with DIN 53523/3 or ASTM D 1646.

The glass transition temperatures of the nitrile rubbers are in the range from −70° C. to +10° C., preferably in the range from −60° C. to 0° C.

Preference is given to nitrile rubbers according to the invention which comprise repeating units of acrylonitrile, 1,3-butadiene and optionally of one or more further copolymerizable monomers. Preference is likewise given to nitrile rubbers having repeating units of acrylonitrile, 1,3-butadiene and one or more α,β-unsaturated monocarboxylic or dicarboxylic acids, their esters or amides, and in particular repeating units of an alkyl ester of an α,β-unsaturated carboxylic acid, very particularly preferably of methyl (meth)acrylate, ethyl (meth)acrylate, propyl (meth)acrylate, n-butyl (meth)acrylate, t-butyl (meth)acrylate, hexyl (meth)acrylate, 2-ethylhexyl (meth)acrylate, octyl (meth)acrylate or lauryl (meth)acrylate.

The present invention further provides a process for producing nitrile rubbers by emulsion polymerization of at least one α,β-unsaturated nitrile, at least one conjugated diene and optionally one or more further copolymerizable monomers in the presence of a molecular weight regulator, with the latex containing the nitrile rubber which is obtained in the polymerization being subjected to coagulation and the coagulated nitrile rubber subsequently being washed, characterized in that
(i) the latex obtained in the emulsion polymerization has a pH of at least 6 before the coagulation,
(ii) the coagulation of the latex is carried out using at least one salt of a mono-, di- or trivalent metal, which is optionally a chloride, as precipitant,
(iii) the coagulation of the latex is carried out in the presence of polyvinyl acetate, which is optionally partially or fully hydrolysed, as coprecipitant, and
(iv) the coagulation of the latex and/or the work-up of the coagulated latex is carried out using water containing chloride ions if the salt of the mono-, di- or trivalent metal (ii) is not a chloride.

This process reliably provides the nitrile rubbers of the invention with the required specific chlorine content. Furthermore, it has the advantage that it permits a substantial reduction in the amounts of salt required for the coagulation of nitrile rubber latices.

The nitrile rubbers are produced by emulsion polymerization in the process of the invention.

Emulsion polymerizations are carried out using emulsifiers. A wide range of emulsifiers is known and available to a person skilled in the art for this purpose. As emulsifiers, it is possible to use, for example, anionic emulsifiers or uncharged emulsifiers. Preference is given to using anionic emulsifiers, particularly preferably in the form of water-soluble salts.

As anionic emulsifiers, it is possible to use modified resin acids which are obtained by dimerization, disproportionation, hydrogenation and modification of resin acid mixtures containing abietic acid, neoabietic acid, palustric acid, laevopimaric acid. A particularly preferred modified resin acid is disproportionated resin acid (Ullmann's Encyclopedia of Industrial Chemistry, 6th Edition, Volume 31, pp. 345-355).

It is also possible to use fatty acids as anionic emulsifiers. These contain from 6 to 22 carbon atoms per molecule. They can be fully saturated or have one or more double bonds in the molecule. Examples of fatty acids are caproic acid, lauric acid, myristic acid, palmitic acid, stearic acid, oleic acid, linoleic acid, linolenic acid. The carboxylic acids are usually based on origin-specific oils or fats such as caster oil, cottonseed oil, peanut oil, linseed oil, coconut oil, palm kernel oil, olive oil, rapeseed oil, soybean oil, fish oil and beef tallow, etc. (Ullmann's Encyclopedia of Industrial Chemistry, 6th Edition, Volume 13, pp. 75-108). Preferred carboxylic acids are derived from coconut fatty acid and from beef tallow and are partially or fully hydrogenated.

Such carboxylic acids based on modified resin acids or fatty acids are used as water-soluble lithium, sodium, potassium and ammonium salts. The sodium and potassium salts are preferred.

Further anionic emulsifiers are sulphonates, sulphates and phosphates which are bound to an organic radical. Possible organic radicals are aliphatic radicals, aromatic radicals, alkylated aromatics, fused aromatics and methylene-bridged aromatics, with the methylene-bridged and fused aromatics being able to be additionally alkylated. The length of the alkyl chains is from 6 to 25 carbon atoms. The length of the alkyl chains bound to the aromatics is from 3 to 12 carbon atoms.

The sulphates, sulphonates and phosphates are used as lithium, sodium, potassium and ammonium salts. The sodium, potassium and ammonium salts are preferred.

Examples of such sulphonates, sulphates and phosphates are Na laurylsulphate, Na-alkylsulphonate, Na-alkylarylsulphonate, Na salts of methylene-bridged aryl sulphonates, Na salts of alkylated naphthalonesulphonates and the Na salts of methylene-bridged naphthalenesulphonates which can also be oligomerized, with the degree of oligomerization being in the range from 2 to 10. The alkylated naphthalenesulphonic acids and the methylene-bridged (and optionally alkylated) naphthalenesulphonic acids are usually present as mixtures of isomers which can also contain more than 1 sulphonic acid group (from 2 to 3 sulphonic acid groups) in the molecule. Particular preference is given to Na laurylsulphate, Na alkylsulphonate mixtures having from 12 to 18 carbon atoms, Na alkylarylsulphonates, Na diisobutylene-naphthalenesulphonate, methylene-bridged polynaphthalenesulphonate mixtures and methylene-bridged arylsulphonate mixtures.

Uncharged emulsifiers are derived from addition products of ethylene oxide and of propylene oxide onto compounds having a sufficiently acidic hydrogen. These include, for example, phenol, alkylated phenol and alkylated amines. The average degrees of polymerization of the epoxides are in the range from 2 to 20. Examples of uncharged emulsifiers are ethoxylated nonylphenols having 8, 10 and 12 ethylene oxide units. The uncharged emulsifiers are usually not used alone but in combination with anionic emulsifiers.

Preference is given to the Na and K salts of disproportionated abietic acid and of partially hydrogenated tallow fatty acid and also mixtures thereof, sodium laurylsulphate, Na alkylsulphonates, sodium alkylbenzenesulphonate and also alkylated and methylene-bridged naphthalenesulfonic acids.

The emulsifiers are used in an amount of from 0.2 to 15 parts by weight, preferably from 0.5 to 12.5 parts by weight, particularly preferably from 1.0 to 10 parts by weight, per 100 parts by weight of the monomer mixture.

The emulsion polymerization is carried out using the emulsifiers mentioned. If latices which due to some instability tend to premature self-coagulation are obtained after the polymerization, the emulsifiers mentioned can also be used for after-stabilization of the latices. This can, in particular, be necessary before removal of unreacted monomers by treatment with steam or before storage of the latex.

To regulate the molecular weight of the nitrile rubber formed, use is made of at least one molecular weight regulator.

The regulator is usually used in an amount of from 0.01 to 3.5 parts by weight, preferably from 0.05 to 2.5 parts by weight, per 100 parts by weight of the monomer mixture.

To set the molecular weight, it is possible to use mercaptan-containing carboxylic acids, mercaptan-containing alcohols, xanthogen disulphides, thiuram disulphides, halogenated hydrocarbons, branched aromatic or aliphatic hydrocarbons and also linear or branched mercaptans. These compounds usually have from 1 to 20 carbon atoms (see Rubber Chemistry and Technology (1976), 49(3), 610-49 (Uraneck, C. A.): "Molecular weight control of elastomers prepared by emulsion polymerization" and D. C. Blackley. Emulsion Polymerization, Theory and Practice, Applied Science Publishers Ltd London, 1975, pp. 329-381).

Examples of mercaptan-containing alcohols and mercaptan-containing carboxylic acids are monothioethylene glycol and mercaptopropionic acid.

Examples of xanthogen disulphides are dimethylxanthogen disulphide, diethylxanthogen disulphide and diisopropylxanthogen disulphide.

Examples of thiuram disulphides are tetramethylthiuram disulphide, tetraethylthiuram disulphide and tetrabutylthiuram disulphide.

Examples of halogenated hydrocarbons are carbon tetrachloride, chloroform, methyl iodide, diodomethane, difluorodiiodomethane, 1,4-diiodobutane, 1,6-diiodohexane, ethyl bromide, ethyl iodide, 1,2-dibromotetrafluoroethane, bromotrifluoroethene, bromodifluoroethene.

Examples of branched hydrocarbons are those from which an H free radical can easily be split off. Examples are toluene, ethylbenzene, cumene, pentaphenylethane, triphenylmethane, 2,4-diphenyl-4-methyl-1-pentene, dipentene and also terpenes such as limonene, α-pinene, β-pinene, α-carotene and β-carotene.

Examples of linear or branched mercaptans are n-hexyl mercaptan or else mercaptans which contain 12-16 carbon atoms and at least three tertiary carbon atoms, with the sulphur being bound to one of these tertiary carbon atoms. These mercaptans are preferred and can be used either individually or in mixtures. Suitable mercaptans are, for example, the addition compounds of hydrogen sulphide onto oligomerized propene, in particular tetrameric propene, or onto oligomerized isobutene, in particular rimeric isobutene, which are frequently referred to as tertiary dodecyl mercaptan ("t-DDM") in the literature.

Such alkyl thiols or (isomer) mixtures of alkyl thiols are either commercially available or can be prepared by a person skilled in the art using methods which are adequately described in the literature (see, for example, JP 07-316126, JP 07-316127 and JP 07-316128 and also GB 823,823 and GB 823,824).

An example of an alkyl thiol which comes within the above definition is 2,2,4,6,6,8,8-pentamethylheptane-4-thiol.

Use may also be made of a mixture of $C_{12}$-mercaptans containing
2,2,4,6,6-pentamethylheptane-4-thiol,
2,4,4,6,6-pentamethylheptane-2-thiol,
2,3,4,6,6-pentamethylheptane-2-thiol and
2,3,4,6,6-pentamethylheptane-3-thiol,
which together with a process for preparing it is described in German Patent Application DE 10 2007 024009. This specific mixture can be obtained by reaction of hydrogen sulphide with triisobutene at temperatures in the range from 0° C. to −60° C. in a continuous process in which (a) the hydrogen sulphide is subjected to drying before the reaction, (b) the triisobutene used has a water content of not more than 70 ppm, (c) boron trifluoride is used as catalyst in amounts of not more than 1.5% by weight, based on the triisobutene used, (d) the reaction is carried out in the absence of compounds which form complexes with boron trifluoride and (e) the reaction mixture is brought into contact with an aqueous alkali solution after the reaction to remove the catalyst.

The individual alkyl thiols and/or mixtures thereof are generally used in an amount of from 0.05 to 3 parts by weight, preferably from 0.1 to 1.5 parts by weight, per 100 parts by weight of the monomer mixture.

The molecular weight regulator or molecular weight regulator mixture is introduced either at the beginning of the polymerization or else in portions during the polymerization, with preference being given to addition of all or individual components of the regulator mixture in portions during the polymerization.

Owing to its function, the molecular weight regulator is to a certain extent present in the form of end groups in the nitrile rubber. Thus if, for example, an alkyl thiol or a mixture of alkyl thiols is used, the nitrile rubber has a certain amount of alkyl thiol end groups. When the above-described specific mixture of $C_{12}$-mercaptans is used, these end groups are thus the corresponding thiol end groups of the thiols present in the regulator mixture, i.e. 2,2,4,6,6-pentamethylheptane-4-thio and/or 2,4,4,6,6-pentamethylheptane-2-thio and/or 2,3,4,6,6-pentamethylheptane-2-thio and/or 2,3,4,6,6-pentamethylheptane-3-thio end groups. This kind of nitrile rubber preferably contains 2,2,4,6,6-pentamethylheptane-4-thio, 2,4,4,6,6-pentamethylheptane-2-thio, 2,3,4,6,6-pentamethylheptane-2-thio and 2,3,4,6,6-pentamethylheptane-3-thio end groups.

Initiation of the emulsion polymerization is typically carried out using polymerization initiators which disintegrate into free radicals (free radical polymerization initiators). As such initiators include compounds which contain an —O—O-unit (peroxo compounds) or an —N=N— unit (azo compound).

The peroxo compounds include hydrogen peroxide, peroxodisulphates, peroxodiphosphates, hydroperoxides, peracids, peracid esters, peracid anhydrides and peroxides having two organic radicals. Suitable salts of peroxodisulphuric acid and of peroxodiphosphoric acid are the sodium, potassium and ammonium salts. Suitable hydroperoxides are, for example, t-butyl hydroperoxide, cumene hydroperoxide and p-menthane hydroperoxide. Suitable peroxides having two organic radicals are dibenzoyl peroxide, bis-2,4-dichlorobenzoyl peroxide, di-t-butyl peroxide, dicumyl peroxide, t-butyl perbenzoate, t-butyl peracetate, etc. Suitable azo compounds are azobisisobutyronitrile, azobisvaleronitrile and azobiscyclohexanenitrile.

Hydrogen peroxide, hydro peroxides, peracids, peracid esters, peroxodisulphate and peroxodisphosphate are also used in combination with reducing agents. Suitable reducing agents are sulphenates, sulphinates, sulphoxylates, dithionite, sulphite, metabisulphite, disulphite, sugar, urea, thiourea, xanthogenates, thioxanthogenates, hydrazinium salts, amines and amine derivatives such as aniline, dimethylaniline, monoethanolamine, diethanolamine or triethanolamine. Initiator systems consisting of an oxidizing agent and a reducing agent are referred to as redox systems. When redox systems are employed, salts of transition metals such as iron, cobalt or nickel are frequency also used in combination with suitable complexing agents such as sodium ethylenediaminetetraacetate, sodium nitrilotriacetate and trisodium phosphate or tetrapotassium diphosphate.

Preferred redox systems are: 1) potassium peroxodisulphate in combination with triethanolamine, 2) ammonium peroxodiphosphate in combination with sodium metabisulphite ($Na_2S_2O_5$), 3) p-methane hydroperoxide/sodium formaldehydesulphoxylate in combination with Fe(II) sulphate ($FeSO.*7H_2O$), sodium ethylenediaminoacetate and trisodium phosphate, 4) cumene hydroperoxide/sodium formaldehydesulphoxylate in combination with Fe(II) sulphate ($FeSO_4*7H_2O$), sodium ethylenediaminoacetate and tetrapotassium disphosphate.

The amount of oxidizing agent is from 0.001 to 1 part by weight per 100 parts by weight of monomer. The molar amount of reducing agent is in the range from 50% to 500%, based on the molar amount of the oxidizing agent used.

The molar amount of complexing agents is based on the amount of transition metal used and is usually equimolar with this.

To carry out the polymerization, all or individual components of the initiator system are introduced at the beginning of the polymerization or during the polymerization.

The addition of all or individual components of the activator system in portions during the polymerization is preferred. The sequential addition enables the reaction rate to be controlled.

The polymerization time is in the range from 5 h to 15 h and depends essentially on the acrylonitrile content of the monomer mixture and on the polymerization temperature.

The polymerization temperature is in the range from 0 to 30° C., preferably in the range from 5 to 25° C.

After conversions in the range from 50 to 90%, preferably in the range from 65 to 85%, have been reached, the polymerization is stopped.

For this purpose, a stopper is added to the reaction mixture. Suitable stoppers are, for example, dimethyl dithiocarbamate, Na nitrite, mixtures of dimethyl dithiocarbamate and Na nitrite, hydrazine and hydroxylamine and also salts derived therefrom, e.g. hydrazinium sulphate and hydroxylammonium sulphate, diethylhydroxylamine, diisopropylhydroxylamine, water-soluble salts of hydroquinone, sodium dithionite, phenyl-α-naphthylamine and aromatic phenols such as tert-butylcatechol or phenothiazine.

The amount of water used in the emulsion polymerization is in the range from 100 to 900 parts by weight, preferably in the range from 120 to 500 parts by weight, particularly preferably in the range from 150 to 400 parts by weight, of water per 100 parts by weight of the monomer mixture.

To reduce the viscosity during the polymerization, to adjust the pH and also as pH buffer, salts can be added to the aqueous phase in the emulsion polymerization. Typical salts are salts of monovalent metals in the form of potassium and sodium hydroxide, sodium sulphate, sodium carbonate, sodium hydrogencarbonate, sodium chloride and potassium chloride. Preference is given to sodium and potassium hydroxide, sodium hydrogencarbonate and potassium chloride. The amounts of these electrolytes are in the range from 0 to 1 part by weight, preferably from 0 to 0.5 part by weight, per 100 parts by weight of the monomer mixture.

The polymerization can be carried out either batchwise or continuously in a cascade of stirred vessels.

To achieve a uniform course of the polymerization, only part of the initiator system is used to start the polymerization and the remainder is fed in during the polymerization. The polymerization is usually started using from 10 to 80% by weight, preferably 30-50% by weight, of the total amount of initiator. The introduction of individual constituents of the initiator system after commencement of the polymerization is also possible.

If chemically uniform products are to be produced, further acrylonitrile or butadiene is introduced when the composition goes outside the azeotropic butadiene/acrylonitrile ratio. Further introduction is preferably the case in the case of NBR grades having acrylonitrile contents of from 10 to 34 and in the case of grades containing from 40 to 50% by weight of acrylonitrile (W. Hofmann, Rubber Chem. Technol. 36 (1963) 1). The further introduction is, as indicated, for example, in DD 154 702, preferably carried out under computer control on the basis of a computer program.

To remove unreacted monomers and volatile constituents, the stopped latex is subjected to a steam distillation. Here, temperatures in the range from 70° C. to 150° C. are employed, with the pressure being reduced at temperatures of <100° C.

Before removal of the volatile constituents, the latex can be after-stabilized by means of an emulsifier. For this purpose, it is advantageous to use the abovementioned emulsifiers in amounts of from 0.1 to 2.5% by weight, preferably from 0.5 to 2.0% by weight, per 100 parts by weight of nitrile rubber.

Before or during coagulation of the latex, one or more ageing inhibitors can be added to the latex. Phenolic, amine and other ageing inhibitors are suitable for this purpose.

Suitable phenolic ageing inhibitors are alkylated phenols, styrenized phenol, sterically hindered phenols such as 2,6-di-tert-butylphenol, 2,6-di-tert-butyl-p-cresol (BHT), 2,6-di-tert-butyl-4-ethylphenol, sterically hindered phenols containing ester groups, sterically hindered phenols containing thioethers, 2,2'-methylenebis(4-methyl-6-tert-butylphenol) (BPH) and sterically hindered thiobisphenols.

If discoloration of the rubber is of no importance, amine ageing inhibitors, e.g. mixtures of diaryl-p-phenylenediamines (DTPD), octylated diphenylamine (ODPA), phenyl-α-naphthylamine (PAN), phenyl-β-naphthylamine (PBN), preferably ones based on phenylenediamine, are also used. Examples of phenylenediamines are N-isopropyl-N'-phenyl-p-phenylenediamine, N-1,3-dimethylbutyl-N'-phenyl-p-phenylenediamine (6PPD), N-1,4-dimethylpentyl-N'-phenyl-p-phenylenediamine (7PPD), N,N'-bis-1,4-(1,4-dimethylpentyl)-p-phenylenediamine (77PD), etc.

The other ageing inhibitors include phosphites such as tris(nonylphenyl) phosphite, polymerized 2,2,4-trimethyl-1,2-dihydmrquinoline (TMQ), 2-mercaptobenzimidazole (MBI), methyl-2-mercaptobenzimidazole (MMBI), zinc methylmercaptobenzimidazole (ZMMBI). The phosphites are generally used in combination with phenolic ageing inhibitors. TMQ, MBI and MMBI are used particularly for NBR grades which are vulcanized peroxidically.

Coagulation of the Latex:

For coagulation, the latex is used with a pH of at least 6, preferably of >6. If desired, this pH is set by addition of a base, preferably of ammonia and/or sodium hydroxide or potassium hydroxide. For latex coagulation by the process of the invention, acids are not used.

1. Precipitant: Salt of a Mono-, Di- or Trivalent Metal

As a precipitant for latex coagulation, use is made of at least one salt of a monovalent, divalent or trivalent metal.

Anions used in these salts are typically monovalent or divalent anions. Preference is given to halides, particular preference to chloride. It is also possible to use nitrates, sulphates, hydrogen-carbonates, carbonates, formates and acetates.

The coagulation is carried out preferably using at least one salt selected from the group consisting of aluminium, calcium, magnesium, sodium, potassium and lithium salts.

Suitable examples include sodium chloride, potassium chloride, calcium chloride, magnesium chloride, magnesium sulphate, sodium nitrate, potassium nitrate, sodium sulphate, potassium sulphate, sodium hydrogencarbonate, potassium hydrogencarbonate, sodium carbonate, potassium carbonate, aluminium sulphate, potassium aluminium sulphate (potassium alum), sodium aluminium sulphate (sodium alum), sodium acetate, calcium acetate and calcium formate.

This salt is used typically in the form of a solution whose concentration is 0.33% to 30% by weight.

Where two or more different salts are used as precipitants, they can be employed as a joint aqueous solution or else in the form of separate aqueous solutions.

For the preparation of the salt solution(s) it is possible to use either deionized water (also "DW" for short) or else non-deionized water (also "BW" for short). Non-deionized water contains chloride ions.

The total amount of salts required for latex coagulation is 0.1%-20% by weight, preferably 0.2-15% by weight, more preferably 0.5%-10% by weight of salt, based on 100% by weight of nitrile rubber.

Coprecipitant: Optionally Partly or Fully Hydrolysed Polyvinyl Acetate

It is important for the process of the invention that use is made, in addition to the salt of a monovalent, divalent or trivalent metal, of polyvinyl acetate, which optionally is partly or fully hydrolysed, as coprecipitant.

The optionally partly or fully hydrolysed polyvinyl acetate for use in accordance with the invention may comprise grades differing in molecular weight (or viscosity in aqueous solutions) and differing in degree of esterification (see Ullmann's Encylcopädie der Technischen Chemie, 4th edition, Volume 19, Verlag Chemie, Weinheim-Deerfield Beach Florida-Basel (1980), pp. 374-378).

The viscosity of the optionally partly or fully hydrolysed polyvinyl acetate for use is determined in accordance with DIN 53015 on 4% strength solutions in distilled water at 20° C., and is situated in the range from 0.5 to 200 cP, preferably in the range from 1 to 100 cP, particularly preferably in the range from 3 to 70 cP.

The ester number of the optionally partly or fully hydrolysed polyvinyl acetate to be used is determined in accordance with Houben-Weyl, Methoden der organischen Chemie, 4th edition. Volume 2, Analytische Methoden, Georg-Thieme-Verlag (1953) pp. 514-115, and is situated in the range from 0 to 240. i.e. the grades in question may be unhydrolysed grades or partially hydrolysed grades or fully hydrolysed grades.

The optionally partly or fully hydrolysed polyvinyl acetate is used typically in the form of an aqueous solution which possesses a concentration in the range from 0.1% to 10% by weight, preferably in the range from 0.5% to 5% by weight, based on the nitrile rubber.

It should be noted that it is readily possible to carry out the process of the invention with the desired success in the absence of further precipitation auxiliaries, and more particularly in the absence of $C_1$-$C_4$-alkyl celluloses, hydroxyalkyl celluloses, plant-derived proteinaceous materials or polysaccharides, such as starch, for example, or water-soluble polyamine compounds, and also gelatins. What is important is the use of polyvinyl acetate.

The latex used for coagulation advantageously possesses a solids concentration in the range from 1% to 40% by weight, preferably in the range from 5% to 35% by weight, particularly preferably in the range from 10% to 30% by weight and very particularly preferably in the range from 10% to 20% by weight.

Latex coagulation may take place continuously or discontinuously. Preference is given to continuous coagulation, which is carried out using nozzles.

Latex coagulation is carried out in the temperature range from 10 to 100° C. Preferably, latex coagulation takes place at a temperature in the range from 20 to 90° C.

With all of the variants set out below, it is useful if, after all of the substances and solutions needed for the coagulation have been combined, the reaction mixture has an elevated temperature.

The sequence of the addition of the precipitant, and of the polyvinyl acetate as coprecipitant, to the NBR latex is not critical. The following procedures are possibilities:

1) Addition of the aqueous salt solution(s) to the nitrile rubber latex in an amount not sufficient for quantitative latex coagulation, and subsequent addition of the aqueous solution of the optionally partly or fully hydrolysed polyvinyl acetate. The polyvinyl acetate solution can be added either at room temperature or else after the latex/salt mixture has been heated. It is preferred to add the polyvinyl acetate solution after the latex/salt mixture has been heated to temperatures>50° C., preferably >60° C., particularly preferably >80° C.

2) Addition of an aqueous solution of the optionally partly or fully hydrolysed polyvinyl acetate to the nitrile rubber latex and subsequent addition of the aqueous salt solution(s). The addition of the polyvinyl acetate solution to the latex before the electrolyte solution takes place preferably at temperatures<40° C.

3) Simultaneous addition of the aqueous solutions of the optionally fully or partly hydrolysed polyvinyl acetate and of the salt/salts to the nitrile rubber latex. The simultaneous addition of salt and polyvinyl acetate is made preferably at temperatures<40° C., the reaction mixture being heated, after the addition of the precipitant mixture, to temperatures>50, preferably >60° C.

Where the precipitant used is the salt of a divalent metal, more particularly magnesium chloride, preference is given to variant 1 described above. In the first step, an aqueous $MgCl_2$ solution is added to the NBR latex, the amount of $MgCl_2$ being about 1/10 to 9/10, preferably 1/4 to 1/5, of the amount of salt necessary for quantitative latex coagulation, and, in the second step, the optionally partly or fully hydrolysed polyvinyl acetate is added only at higher temperatures, preferably >60° C., particularly preferably >90° C.

Washing of the Coagulated Nitrile Rubber

After the coagulation, the nitrile rubber is usually present in the form of crumb. The washing of the coagulated NBR is therefore also referred to as crumb washing. It is possible to use either deionized water (also referred to as "DW"), or water which has not been deionized (also referred to as "BW"), for washing this coagulated crumb.

Washing is carried out at a temperature in the range from 15 to 90° C., preferably at a temperature in the range from 20 to 80° C.

The amount of washing water is from 0.5 to 20 parts by weight, preferably from 1 to 10 parts by weight and particularly preferably from 1 to 5 parts by weight, per 100 parts by weight of nitrile rubber.

The rubber crumb is preferably subjected to multistage washing, with the rubber crumb being partially dewatered between the individual washing stages. The residual moisture contents of the crumb between the individual washing stages are in the range from 5 to 50% by weight, preferably in the range from 7 to 25% by weight. The number of washing stages is usually from 1 to 7, preferably from 1 to 3. Washing is carried out batchwise or continuously. Preference is given to using a multistage, continuous process, with countercurrent washing being preferred in order to save water.

Dewatering and Drying

After washing is complete, it has proven useful to dewater the nitrile rubber crumb. This is usually carried out in two stages. In the first stage, the rubber crumb is subjected to preliminary mechanical dewatering. In the second stage, the remaining water is evaporated. Both preliminary dewatering and drying are preferably carried out continuously. Suitable apparatuses for the preliminary mechanical dewatering are strainer screws in which the water is squeezed out laterally via a strainer slit or screws in which mechanical dewatering is effected against the product stream (Welding principle).

Drying of the nitrile rubber which has been subjected to preliminary dewatering is carried out in a fluidized-bed dryer or in a plate dryer. The temperatures during drying are in the range from 80 to 150° C. Preference is given to drying according to a temperature programme, with the temperature being reduced towards the end of the drying process.

The nitrile rubbers of the invention which have the stated specific chlorine content surprisingly lead to vulcanizates which have a very low metal corrosivity, despite the chlorine content in the nitrile rubber being higher than in the case of the halogen-free nitrile rubbers from EP-A-0 779 300 and EP-A-0 779 301. Furthermore, they have the desired high storage stability SS of a maximum of 5 Mooney units. The high storage stability has positive effects as early as during the drying of the nitrile rubber, since otherwise a certain unwanted ageing of the rubber takes place during this drying. The high storage stability aids the setting of a prescribed target Mooney viscosity. As a result, the amount of out-of-specification nitrile rubber is reduced. Furthermore, the high storage stability results in a reduction in complaints due to a change in the Mooney viscosity during long storage or transport times. The rubbers of the invention are suitable for the reproducible production of vulcanizable mixtures. The moldings which can be obtained therefrom by vulcanization thus also display a reproducible mechanical and physical property profile. In addition to the good stability on storage, nitrile rubbers of the invention also have the desired high vulcanization rate (difference of initial vulcanization time minus full vulcanization time) and the vulcanizates obtained have a very good modulus.

The invention therefore also provides for the use of the nitrile rubbers of the invention for producing vulcanizable mixtures containing at least one nitrile rubber according to the invention, at least one crosslinker and optionally further additives.

These vulcanizable mixtures are produced by mixing at least one nitrile rubber according to the invention, at least one crosslinker and optionally further additives.

As crosslinker, it is possible to use, for example, peroxidic crosslinkers such as bis(2,4-dichlorobenzyl) peroxide, dibenzoyl peroxide, bis(4-chlorobenzoyl) peroxide, 1,1-bis-(t-butylperoxy)-3,3,5-trimethylcyclohexane, tert-butyl perbenzoate, 2,2-bis(t-butylperoxy)butene, 4,4-di-tert-butylperoxynonyl valerate, dicumyl peroxide, 2,5-dimethyl-2,5-di(t-butylperoxy)hexane, tert-butyl cumyl peroxide, 1,3-bis(t-butylperoxyisopropyl)benzene, di-t-butyl peroxide and 2,5-dimethyl-2,5-di(t-butylperoxy)hex-3-yne.

It can be advantageous to use not only these peroxidic crosslinkers but also further additives by means of which the crosslinking yield can be increased: suitable additives of this type are, for example, triallyl isocyanurate, triallyl cyanurate, trimethylolpropane tri(meth)acrylate, triallyl trimellitate, ethylene glycol dimethacrylate, butanediol dimethacrylate, trimethylolpropane trimethacrylate, Zn diacrylate, Zn dimethacrylate, 1,2-polybutadiene or N,N'-m-phenylenedimaleimide.

The total amount of the crosslinker or crosslinkers is usually in the range from 1 to 20 phr, preferably in the range from 1.5 to 15 phr and particularly preferably the range from 2 to 10 phr, based on the nitrile rubber.

It is also possible to use sulphur in elemental soluble or insoluble form or sulphur donors as crosslinker.

Possible sulphur donors are, for example, dimorpholyl disulphide (DTDM), 2-morpholino-dithiobenzothiazol (MBSS), caprolactam disulphide, dipentamethylenethiuram tetrasulphide (DPTT), and tetramethylthiuram disulphide (TMTD).

In the sulphur vulcanization of the nitrile rubbers of the invention, too, it is possible to use further additives by means of which the crosslinking yield can be increased. However, crosslinking can in principle also be carried out using sulphur or sulphur donors alone.

Conversely, crosslinking of the nitrile rubbers of the invention can also be carried out only in the presence of the above-mentioned additives, i.e. without addition of elemental sulphur or sulphur donors.

Suitable additives by means of which the crosslinking yield can be increased are, for example, dithiocarbamates, thiurams, thiazoles, sulphenamides, xanthogenates, guanidine derivatives, caprolactams and thiourea derivatives.

As dithiocarbamates, it is possible to use, for example: ammonium dimethyldithiocarbamate, sodium diethyldithiocarbamate (SDEC), sodium dibutyldithiocarbamate (SDBC), zinc dimethyldithiocarbamate (ZDMC), zinc diethyldithiocarbamate (ZDEC), zinc dibutyklithiocarbamate (ZDBC), zinc ethylphenyldithiocarbamate (ZEPC), zinc dibenzyldithiocarbamate (ZBEC), zinc pentamethylenedithiocarbamate (Z5MC), tellurium diethyldithiocarbamate, nickel dibutyldithiocarbamate, nickel dimethyldithiocarbamate and zinc diisononyldithiocarbamate.

As thiurams, it is possible to use, for example: tetramethylthiuram disulphide (TMTD), tetramethylthiuram monosulphide (TMTM), dimethyldiphenylthiuram disulphide, tetrabenzylthiuram disulphide, dipentamethylenethiuram tetrasulphide and tetraethylthiuram disulphide (TETD).

As thiazoles, it is possible to use, for example: 2-mercaptobenzothiazole (MBT), dibenzthiazyl disulphide (MBTS), zinc mercaptobenzothiazole (ZMBT) and copper-2-mercaptobenzothiazole.

As sulphenamide derivatives, it is possible to use, for example: N-cyclohexyl-2-benzothiazylsulphenamide (CBS), N-tert-butyl-2-benzothiazylsulphenamide (TBBS). N,N'-dicyclohexyl-2-benzothiazylsulphenamide (DCBS), 2-morpholinothiobenzothiazole (MBS), N-oxydiethylenethiocarbamyl-N-tert-butylsulphenamide and oxydiethylenethiocarbamyl-N-oxy-ethylenesulphenamide.

As xanthogenates, it is possible to use, for example: sodium dibutylxanthogenate, zinc isopropyl-dibutylxanthogenate and zinc dibutylxanthogenate.

As guanidine derivatives, it is possible to use, for example: diphenylguanidine (DPG), di-o-tolylguanidine (DOTG) and o-tolylbiguanide (OTBG).

As dithiophosphates, it is possible to use, for example: zinc dialkydithiophosphate (chain length of the alkyl radicals: $C_2$ to $C_{16}$), copper dialkyldithiophosphates (chain length of the alkyl radicals: $C_2$ to $C_{16}$) and dithiophosphoryl polysulphide.

As caprolactam, it is possible to use, for example, dithiobis-caprolactam.

As thiourea derivatives, it is possible to use, for example, N,N'-diphenylthiourea (DPTU), diethylthiourea (DETU) and ethylenethiourea (ETU).

Further suitable additives are, for example: zinc diaminediisocyanate, hexamethylenetetramine, 1,3-bis(citraconimidomethyl)benzene and cyclic disulphanes.

Both the additives mentioned and the crosslinkers can be used either individually or in mixtures. Preference is given to using the following substances for crosslinking the nitrile rubbers: sulphur, 2-mercaptobenzothiazol, tetramethylthiuram disulphide, tetramethylthiuram monosulphide, zinc dibenzyldithiocarbamate, dipentamethylenethiuram tetrasulphide, zinc dialkydithiophosphate, dimorpholyl disulphide, tellurium diethyldithiocarbamate, nickel dibutyldithiocarbamate, zinc dibutyldithiocarbamate, zinc dimethyldithiocarbamate and dithiobiscaprolactam.

The crosslinkers and abovementioned additives can each be used in amounts of from about 0.05 to 10 phr, preferably from 0.1 to 8 phr, in particular from 0.5 to 5 phr (single addition, in each case based on the active substance).

In sulphur crosslinking according to the invention, it may also be useful to employ further inorganic or organic substances in addition to the crosslinkers and abovementioned additives. Examples of such further substances are: zinc oxide, zinc carbonate, lead oxide, magnesium oxide, calcium oxide, saturated or unsaturated organic fatty acids and their zinc salts, polyalcohols, amino alcohols such as triethanolamine and also amines such as dibutylamine, dicyclohexylamine, cyclohexylethylamine and polyether amines.

In addition, it is also possible to use initial vulcanization inhibitors. These include cyclohexylthiophthalimide (CTP), N,N'-dinitrosopentamethylenetetramine (DNPT), phthalic anhydride (PTA) and diphenylnitrosamine. Preference is given to cyclohexylthiophthalimide (CTP).

Apart from the addition of the crosslinker or crosslinkers, the nitrile rubber of the invention can also be mixed with further customary rubber additives.

These include, for example, the typical substances which are adequately known to those skilled in the art, for example fillers, filler activators, ozone protection agents, ageing inhibitors, antioxidants, processing aids, extender oils, plasticizers, reinforcing materials and mould release agents.

As fillers, it is possible to use, for example, carbon black, silica, barium sulphate, titanium dioxide, zinc oxide, calcium oxide, calcium carbonate, magnesium oxide, aluminium oxide, iron oxide, aluminium hydroxide, magnesium hydroxide, aluminium silicates, diatomaceous earth, talc, kaolins, bentonites, carbon nanotubes, Teflon (the latter preferably in powder form) or silicates.

Possible filler activators are, in particular, organic silanes such as vinyltrimethyloxysilane, vinyldimethoxymethylsilane, vinyltriethoxysilane, vinyltris(2-methoxyethoxy)silane, N-cyclohexyl-3-aminopropyltrimethoxysilane, 3-aminopropyltrimethoxysilane, methyltrimethoxysilane, methyltriethoxysilane, dimethyldimethoxysilane, dimethyldiethoxysilane, trimethylethoxysilane, isooctyltrimethoxysilane, isooctyltriethoxysilane, hexadecyltrimethoxysilane or (octadecyl)methyldimethoxysilane. Further filler activators are, for example, surface-active substances such as triethanolamine and ethylene glycols having molecular weights of from 74 to 10 000 g/mol. The amount of filler activators is usually from 0 to 10 phr, based on 100 phr of the nitrile rubber.

As ageing inhibitors, it is possible to add those which have already been described in the present application in respect of coagulation of the latex to the vulcanizable mixtures. These are usually used in amounts of about 0-5 phr, preferably from 0.5 to 3 phr, based on 100 phr of the nitrile rubber.

Possible mould release agents are, for example: saturated and partially unsaturated fatty acids and oil acids and their derivatives (fatty acid esters, fatty acid salts, fatty alcohols, fatty acid amides), which are preferably employed as constituents of the mixture, also products which can be applied to the mould surface, for example products based on low molecular weight silicone compounds, products based on fluoropolymers and products based on phenolic resins.

When used as constituents of the mixture, the mould release agents are used in amounts of about 0-10 phr, preferably from 0.5 to 5 phr, based on 100 phr of the nitrile rubber.

Reinforcement by means of strength carriers (fibres) composed of glass, according to the teachings of U.S. Pat. No. 4,826,721, is also possible as is reinforcement by means of cords, woven fabrics, fibres composed of aliphatic and aromatic polyamides (Nylon®, Aramid®), polyesters and natural fibre products.

The invention further provides a process for producing moldings based on at least one nitrile rubber according to the invention, which is characterized in that the above-described vulcanizable mixture is vulcanized in a shaping process, preferably using injection-moulding.

The invention thus likewise provides the shaped part which can be obtained by the abovementioned vulcanization process.

This process makes it possible to produce a large number of moldings, in particular seals, caps, hoses or diaphragms. The nitrile rubbers of the invention are particularly suitable for producing an O-ring seal, a flat seal, a corrugated sealing ring, a sealing sleeve, a sealing cap, an oil cooler hose, a servo control hose, an air conditioner hose, a thermal insulation hose, and diaphragms for hydro bearings or diaphragm pumps, for example.

As an alternative to the direct production of moldings based on the nitrile rubber of the invention, it is also possible for the production of the nitrile rubber of the invention to be followed by either (i) a metathesis reaction or (ii) a metathesis reaction and a subsequent hydrogenation or (iii) only a hydrogenation. These metathesis and hydrogenation reactions are both adequately known to those skilled in the art and are described in the literature.

The metathesis is known, for example, from WO-A-02/100941 and WO-A-02/100905.

A hydrogenation can be carried out using homogeneous or heterogeneous hydrogenation catalysts. It is also possible to carry out the hydrogenation in situ, i.e. in the same reaction vessel in which, if appropriate, the metathetic degradation has previously also been carried out and without the necessity of isolating the degraded nitrile rubber. The hydrogenation catalyst is simply added to the reaction vessel.

The catalysts used are usually based on rhodium, ruthenium or titanium, but it is also possible to use platinum, iridium, palladium, rhenium, ruthenium, osmium, cobalt or copper either as metal or preferably in the form of metal compounds (see, for example, U.S. Pat. No. 3,700,637, DE-A-25 39 132, EP-A-0 134 023, DE-A-35 41 689, DE-A-35 40 918, EP-A-0 298 386, DE-A-35 29 252, DE-A-34 33 392, U.S. Pat. No. 4,464,515, U.S. Pat. No. 4,503,196).

Suitable catalysts and solvents for a hydrogenation in the homogeneous phase are described below and are also known from DE-A-25 39 132 and EP-A-0 471 250.

The selective hydrogenation can, for example, be achieved in the presence of a rhodium- or ruthenium-containing catalyst. It is possible to use, for example, a catalyst of the general formula $$(R^1_m B)_l M X_n$$

where M is ruthenium or rhodium, the radicals $R^1$ are identical or different and are each a $C_1$-$C_8$-alkyl group, a $C_4$-$C_8$-cycloalkyl group, a $C_6$-$C_{15}$-aryl group or a $C_7$-$C_{15}$-aralkyl group, B is phosphorus, arsenic, sulphur or a sulphoxide group S=O, X is hydrogen or an anion, preferably halogen and particularly preferably chlorine or bromine, l is 2, 3 or 4, m is 2 or 3 and n is 1, 2 or 3, preferably 1 or 3. Preferred catalysts are tris(triphenylphosphine)rhodium(I) chloride, tris(triphenylphosphine)rhodium(III) chloride and tris(dimethyl sulphoxide)rhodium(III) chloride and also tetrakis(triphenylphosphine)rhodium hydride of the formula $(C_4H_5)_3P)_4RhH$ and the corresponding compounds in which the triphenylphosphine has been completely or partly replaced by tricyclohexylphosphine. The catalyst can be used in small amounts. An amount in the range 0.01-1% by weight, preferably in the range from 0.03-0.5% by weight and particularly preferably in the range 0.1-0.3% by weight, based on the weight of the polymer, is suitable.

It is normally useful to use the catalyst together with a cocatalyst which is a ligand of the formula $R^1_m B$, where $R^1$, m and B are as defined above for the catalyst. Preference is given to m being 3, B being phosphorus and the radicals $R^1$ can be identical or different. Preference is given to cocatalysts having trialkyl, tricycloalkyl, triaryl, triaralkyl, diaryl monoalkyl, diaryl monocycloalkyl, dialkyl monoaryl, dialkyl monocycloalkyl, dicycloalkyl monoaryl or dicycloalkyl monoaryl radicals.

Examples of cocatalysts may be found, for example, in U.S. Pat. No. 4,631,315. A preferred cocatalyst is triphenylphosphine. The cocatalyst is preferably used in amounts in the range 0.3-5% by weight, preferably in the range 0.5-4% by weight, based on the weight of the nitrile rubber to be hydrogenated. Preference is also given to the weight ratio of the rhodium-containing catalyst to the cocatalyst being in the range from 1:3 to 1:55, particularly preferably in the range from 1:5 to 1:45. Based on 100 parts by weight of the nitrile rubber to be hydrogenated, it is useful to employ from 0.1 to 33 parts by weight of the cocatalyst, preferably from 0.5 to 20 parts by weight and very particularly preferably from 1 to 5 parts by weight, in particular more than 2 but less than 5 parts by weight.

The practical procedure for this hydrogenation is adequately known to a person skilled in the art from U.S. Pat. No. 6,683,136. It is usually carried out by treating the nitrile rubber to be hydrogenated in a solvent such as toluene or monochlorobenzene with hydrogen at a temperature in the range from 100 to 150° C. and a pressure in the range from 50 to 150 bar for from 2 to 10 hours.

For the purposes of the present invention, hydrogenation is a reaction of at least 50%, preferably 70-100%, particularly preferably 80-100%, of the double bonds present in the starting nitrile rubber.

When heterogeneous catalysts are used, they are usually supported catalysts based on palladium which are supported on, for example, carbon, silica, calcium carbonate or barium sulphate.

The optionally hydrogenated nitrile rubbers obtained by metathesis and/or hydrogenation reaction of the nitrile rubbers of the invention can be introduced in a manner analogous to the nitrile rubbers of the invention into vulcanizable compositions and used for producing vulcanizates and moldings based on such vulcanizates. These optionally hydrogenated nitrile rubbers have Mooney viscosities (ML (1+4 @ 100° C.)) of from 1 to 50, preferably from 1 to 40, Mooney units.

EXAMPLES

I Chlorine Content

The chlorine content of the nitrile rubbers of the invention is determined as follows by a method based on DIN EN 14582, method A: the nitrile rubber sample is digested in a melt of sodium peroxide and potassium nitrate in a Parr pressure vessel. Sulphite solution is added to the resulting melt and the mixture is acidified with sulphuric acid. In the solution obtained, the chloride formed is determined by potentiometric titration with silver nitrate solution and calculated as chlorine.

II Storage stability

The dried NBR rubbers are characterized by the Mooney viscosity before and after hot air storage for 48 hours at 100° C., i.e. the Mooney viscosity was determined once directly after drying (i.e. before hot air storage) and also subsequently after hot air ageing for 48 hours at 100° C.

III Initial Vulcanization Behaviour and Vulcanization Rate

The initial vulcanization behaviour (Mooney scorch) is determined at 120° C. by means of a shear disc viscosimeter in accordance with DIN 53 523. A small rotor (S) is used for the determination. "MS 5 (120° C.)" is the time in minutes during which the Mooney value increases by 5 Mooney units from the minimum value.

The vulcanization rate is determined at 160° C. in accordance with DIN 53 529, part 3, by means of a rheometer from Monsanto (MDR 2000E) as the difference $t_{90}$-$t_{10}$, where $t_{10}$ and $t_{90}$ are the vulcanization times at which 10% and 90%, respectively, of the finale degree of vulcanization are attained.

IV Mechanical Properties

The mechanical properties of the rubbers (e.g. stress at various elongations, ultimate tensile strength and elongation at break) are determined on vulcanizates in accordance with DIN 53 504.

V Metal Corrosivity

The metal corrosivity was determined optically by assessing the surface quality of two aluminium plates with an NBR sealing ring clamped between them, the thus clamped sealing ring having been stored for 6 weeks at 70° C. and at 80% relative atmospheric humidity.

Where the abbreviation "RT" is used in the examples or tables below, this is a temperature of 20° C.+/−2° C.

In the examples below, two nitrile rubber latices having acrylonitrile contents of 28.1% by weight of acrylonitrile (latex A) and 33.2% by weight of acrylonitrile (latex B) were used, and were produced by the following procedures.

TABLE 1

Constituents of the formulations for the production of the nitrile rubber latices A and B and polymerization conditions

| Latex desgination: | A | B |
| --- | --- | --- |
| Butadiene | 65 | 73 |
| Acrylonitrile | 35 | 27 |
| Total amount of water | 200 | 190 |
| Erkantol ® BXG[1] | 3.67 | 3.69 |
| Baykanol ® PQ[2] | 1.10 | 1.10 |
| K salt of coconut fatty acid | 0.73 | 0.73 |
| KOH | 0.05 | 0.05 |
| t-DDM[3] | 0.24/0.24 | 0.24/0.24 |
| Potassium peroxodisulphate[4] | 0.39/0.20 | 0.39/0.19 |
| Tris(α-hydroxyethyl)amine [5] | 0.57 | 0.57 |
| Polymerization temperature [° C.] | 18 | 17 |
| Polymerization conversion [%] | 80 | 75 |
| Polymerization time [h] | 10 | 11 |

[1] Sodium salt of monosulphonated and disulphonated naphthalenesulphonic acids which contain isobutylene oligomer residues (Erkantol ® BXG)
[2] Sodium salt of methylenebisnaphthalene sulphonate (Baykanol ® PQ; Lanxess Deutschland GmbH)
[3] t-DDM (tertiary dodecyl mercaptan): Lanxess Deutschland GmbH
[4] Aldrich catalogue number: 21,622-4
[5] Aldrich catalogue number: T5,830-0

In the preparation of latices A and B, the total amount of the butadiene and acrylonitrile monomers was charged to the reactor in each case. The total amounts of t-DDM and of potassium peroxodisulphate were divided up, with portions being included in the initial charge to the reactor at the beginning of polymerization (in each case first portion indicated in Table 1), and portions being metered into the reactor at a polymerization conversion of 15% (in each case second portion indicated in Table 1).

On reaching the conversions indicated in Table 1), the polymerizations were halted. This was done using the polymerization inhibitors described in Table 2).

TABLE 2

Halting of the polymerizations

| Latex designation: | A | B |
| --- | --- | --- |
| Na dithionite[6] | 1.20 | — |
| Diethylhydroxylamine | — | 1.0 |
| Potassium hydroxide | 1.28 | 1.28 |

[6] Aldrich catalogue No.: 15,795-3

Following removal of unreacted monomers by steam distillation, and following addition of 1.0 part by weight of 2,6-di-tert-butyl-p-cresol (Vulkanox® KB from Lanxess Deutschland GmbH), based on the nitrile rubber, the properties of the two latices were as follows (Table 3).

TABLE 3

Properties of latices A and B

| Latex designation: | A | B |
| --- | --- | --- |
| Particle diameter ($d_{50}$) [nm] | 28 | 36 |
| Solids content [% by weight] | 20.3 | 19.6 |
| pH | 9.9 | 9.3 |
| Acrylonitrile content [% by weight] | 33.2 | 28.1 |

In Example series 1, 2, 3 and 5 described below, latex A was used, and latex B was used for Example series 4.

In Example series 1-5, the fully or partly hydrolysed polyvinyl acetate (PVA) grades specified in Table 4 were employed. All of the stated Polyviol grades are available from Wacker Chemie GmbH, the Mowiol grades, for example, from Kremer Pigmente GmbH & Co. KG.

TABLE 4

Polyvinyl acetate grades used and their properties

| Product designation | Hydrolysis number[1] [mg KOH/g PVA] | Viscosity of polyvinyl acetate solution (4% strength solution at 20° C.)[2] [cP] |
| --- | --- | --- |
| Polyviol W 30/240 | 240 | 30 |
| Polyviol W 25/240 | 240 | 25 |
| Polyviol W 25/190 | 190 | 25 |
| Polyviol V03/140 | 140 | 3 |
| Mowiol 4-88 | 140 | 4 |
| Polyviol M05/140 | 140 | 5 |
| Polyviol M13/140 | 140 | 13 |
| Polyviol W25/140 | 140 | 25 |
| Mowiol 26/88 | 140 | 40 |
| Polyviol W40/140 | 140 | 40 |
| Mowiol 40-88 | 140 | 40 |
| Mowiol 4-98 | 20 | 4 |
| Polyviol 28/20 | 20 | 28 |
| Mowiol 56-98 | 15 | 36 |
| Mowiol 28-99 | 8 | 28 |
| Mowiol 66-100 | 4 | 66 |

[1] Houben Weyl: Methoden der Organischen Chemie, 4th edition, Volume 2, Analytische Methoden, Georg Thieme Verlag (1953)
[2] DIN 53015

In Example series 1, 2 and 3 (Tables 5, 6 and 7) it is shown that using PVA significantly reduces the minimum amount of salt required for quantitative latex coagulation. In Example series 4 (Table 8) it is shown that the nitrile rubbers produced in this way exhibit rapid vulcanization and good vulcanizate properties. In Example series 5 (Table 9) it is shown that using optionally fully or partly hydrolysed polyvinyl acetate as coprecipitant produces nitrile rubbers having specific chlorine contents, and exhibiting low metal corrosivity in the vulcanized state.

In Example series 1, 2 and 3 the minimum amounts of the various PVA grades needed in each case for latex coagulation were ascertained, as needed, in addition to the respective amount of salt, for quantitative latex coagulation.

Example Series 1

NBR Latex Coagulation with $MgCl_2$ and PVA (First Addition of $MgCl_2$ at 20° C., then Addition of PVA at 90° C.)

In Example series 1, latex A (200 g) was first admixed at 20° C. with a 20% strength aqueous solution of the magnesium chloride precipitant and then admixed at 90° C. with a solution of PVA (4% by weight in deionized water).

In the non-inventive, comparative experiment (without PVA), an amount of 1.31% by weight of magnesium chloride was needed for quantitative latex coagulation. In the case of the inventive examples of Example series 1, 0.87% by weight of $MgCl_2$ was used in each case, which was not sufficient for quantitative latex coagulation, and a determination was made of the minimum amounts of PVA required for quantitative latex coagulation.

TABLE 5

Example series 1

| No. | Polyvinyl acetate used | $MgCl_2$ [% by weight] | Amount of PVA based on NBR [% by weight] |
|---|---|---|---|
| Comparative experiment | — | 1.31 | — |
| 1.1 | Polyviol W 30/240 | 0.87 | 0.5 |
| 1.2 | Polyviol W 25/240 | 0.87 | 0.5 |
| 1.3 | Polyviol W 25/190 | 0.87 | 0.5 |
| 1.4 | Polyviol V03/140 | 0.87 | 3.5 |
| 1.5 | Mowiol 4-88 | 0.87 | 2.5 |
| 1.6 | Polyviol M05/140 | 0.87 | 1.0 |
| 1.7 | Polyviol M13/140 | 0.87 | 0.5 |
| 1.8 | Polyviol W25/140 | 0.87 | 0.5 |
| 1.9 | Mowiol 26/88 | 0.87 | 0.6 |
| 1.10 | Polyviol W40/140 | 0.87 | 1.5 |
| 1.11 | Mowiol 40-88 | 0.87 | 1.5 |
| 1.12 | Mowiol 4-98 | 0.87 | 2.0 |
| 1.13 | Polyviol 28/20 | 0.87 | 1.0 |
| 1.14 | Mowiol 56-98 | 0.87 | 0.7 |
| 1.15 | Mowiol 28-99 | 0.87 | 0.7 |
| 1.16 | Mowiol 66-100 | 0.87 | 0.7 |

Example Series 2

NBR Latex Coagulation with $MgCl_2$ and PVA (Simultaneous Addition of $MgCl_2$ and PVA at 20° C. and Subsequent Heating to 90° C.)

In Example series 2), an aqueous solution comprising both the magnesium chloride precipitant and the PVA was metered into the latex A (200 g). The precipitant solution was added to the latex at 20° C., the amount of $MgCl_2$ being held constant. Subsequently the mixture was heated to 90° C. with stirring. In the experiments of Example series 2, the amounts of PVA needed for quantitative latex coagulation were ascertained. These PVA quantities are documented in the table below.

TABLE 6

Example series 2

| No. | Polyvinyl acetate used | $MgCl_2$ [% by weight] | Amount of PVA based on NBR [% by weight] |
|---|---|---|---|
| Comparative experiment | — | 1.31 | — |
| 2.1 | Polyviol W 30/240 | 0.87 | 1.1 |
| 2.2 | Polyviol W 25/240 | 0.87 | 1.5 |
| 2.3 | Polyviol W 25/190 | 0.87 | 1.5 |
| 2.4 | Polyviol V03/140 | 0.87 | 5.0 |
| 2.5 | Mowiol 4-88 | 0.87 | 3.0 |
| 2.6 | Polyviol M05/140 | 0.87 | 1.0 |
| 2.7 | Polyviol M13/140 | 0.87 | 0.8 |
| 2.8 | Polyviol W25/140 | 0.87 | 0.5 |
| 2.9 | Mowiol 26/88 | 0.87 | 1.1 |
| 2.10 | Polyviol W40/140 | 0.87 | 1.7 |
| 2.11 | Mowiol 40-88 | 0.87 | 1.7 |
| 2.12 | Mowiol 4-98 | 0.87 | 3.0 |
| 2.13 | Polyviol 28/20 | 0.87 | 1.5 |
| 2.14 | Mowiol 56-98 | 0.87 | 1.5 |
| 2.15 | Mowiol 28-99 | 0.87 | 1.0 |
| 2.16 | Mowiol 66-100 | 0.87 | 1.3 |

Example Series 3

NBR Latex Coagulation Using PVA (Before and after 10-Week Storage of the Aqueous PVA Solutions)

In Example series 3, the effect of the standing time of the aqueous PVA solution is demonstrated. The experiments in this series were carried out as described for Example series 1, in each case before and after 10-week storage of the aqueous PVA solution.

TABLE 7

Example series 3

| No. | Polyvinyl acetate used | Hydrolysis number [mg KOH/g PVA] | Viscosity (4% strength solution at 20° C.) [cP] | Standing time [weeks] | $MgCl_2$ [% by weight] | Amount of PVA, based on NBR [% by weight] |
|---|---|---|---|---|---|---|
| 3.1 | Polyviol W 25/240 | 240 | 25 | 0 | 0.87 | 0.5 |
| 3.2 | Polyviol W 25/240 | 240 | 25 | 10 | 0.87 | 1.0 |
| 3.3 | Polyviol W 25/190 | 190 | 25 | 0 | 0.87 | 0.5 |
| 3.4 | Polyviol W 25/190 | 190 | 25 | 10 | 0.87 | 1.0 |

The results of Table 7 show that it is somewhat more advantageous to use the PVA solutions without prolonged storage.

Example series 4

Property Comparisons for Nitrile Rubber a) Worked Up in Accordance with the Invention by Latex Coagulation with $MgCl_2$/PVA (experiment 4.4) or b) Not Worked Up in Accordance with the Invention (Experiments C4.1, C4.2, C4.3)

In Example series 4, the nitrile rubber latex B was coagulated in accordance with the invention using $MgCl_2$ and PVA (Experiment 4.4) or else, in the non-inventive experiments 4.1, 4.2 and 4.3, with NaCl (C4.1), magnesium chloride (C4.2) and, in C4.3, with magnesium chloride/methyl cellulose ("MC"; Methocel EXP XZ from Dow) in accordance with the teaching from DE-A 23 32 096.

For the latex coagulation of Example series 4, the amounts of precipitant and coprecipitant documented in the table below were used. In the case of inventive experiment 4.4, $MgCl_2$ and PVA (Mowiol 66-100) were added jointly in a solution at 23° C. as described in the table below. The rubber crumb obtained on coagulation was in each case washed, dewatered and dried.

For the latex coagulation, 25 kg of latex in each case were worked up to the solid state. Latex coagulation took place batchwise in a stirrable, open container with a capacity of 100 l. The salt solutions were prepared using exclusively ion-containing utility water (BW). The concentration of the salt solution, and also the quantities of salt used for precipitation, were calculated in each case without water of crystallization. The salts used in latex coagulation, the concentration of the salt solutions, the amounts of salt used based on the NBR rubber, the coagulation temperature, the temperature for washing, and the duration of washing, etc., are listed in the tables below.

The amounts of salt and coprecipitant were in each case configured in preliminary tests so that the rubber crumb produced on latex coagulation had a size of more than 5 mm, and so would not be carried out on subsequent crumb washing. For crumb washing, the 100 l coagulation vessel was provided with an inflow and an outflow. On the inside of the container, two rails were mounted in such a way as to allow the outflow to be blocked off with a sieve (mesh size 2 mm) before washing was carried out, so that the coagulated crumb was not flushed out on washing. Washing was carried out with a constant water throughput of 200 l/h.

In the experiments, the latex serum obtained on latex coagulation was not removed from the coagulation vessel before the beginning of washing; in other words, the latex serum was removed by dilution washing. Crumb washing was carried out at 60° C. for 5 hours, using non-deionized water. After the end of washing, the rubber crumb was removed with a sieve, subjected to preliminary dewatering in a Welding screw, and dried batchwise in a vacuum drying cabinet at 70° C. to a residual moisture content of <1.5% by weight.

TABLE 8

Example series 4: Conditions for latex coagulation

| | | Conditions for latex coagulation | | | | |
|---|---|---|---|---|---|---|
| No. | Precipitant | Amount of salt, based on NBR [% by wt] | Amount of methyl cellulose, based on NBR [% by wt] | Amount of PVA, based on NBR [% by wt] | Latex temperature on addition of salt [° C.] | Temperature after heating [° C.] |
| C4.1 | NaCl | 31.8 | — | — | 23 | 90 |
| C4.2 | MgCl$_2$ | 2.0 | — | — | 23 | 90 |
| C4.3 | MgCl$_2$/MC* | 1.0 | 0.8 | — | 23 | 90 |
| 4.4 | MgCl$_2$/PVA** | 1.0 | — | 1.0 | 23 | 90 |

*MC denotes methylcellulose
**Mowiol 66-100

After the end of latex coagulation (before the beginning of washing), about 200 g was removed from the latex serum and, for complete removal of polymer residues, was boiled under reflux for ½ h and filtered through a 20μ sieve. The COD value of the serum (COD$_{serum}$) was determined in accordance with DIN 38 409, part 41 or H 41-1 and H 41-2, by determination of the consumption of potassium dichromate in sulphuric acid medium in the presence of a silver sulphate catalyst. On the basis of the COD value of the serum (COD$_{serum}$), the COD remaining in the serum, based on 1 kg of coagulated nitrile rubber (COD$_{NBR}$), was calculated with the aid of the equations specified in the description.

TABLE 9

Example series 4
COD values

| Example | Precipitant | SC (latex B) [% by wt] | m$_p$ [g$_p$// kg$_{latex}$] | COD$_{serum}$ [gO$_2$/ kg$_{serum}$] | COD$_{NBR}$ [gO$_2$/ kg$_{NBR}$] |
|---|---|---|---|---|---|
| C4.1 | NaCl | 19.6 | 0.240 | 49.0 | 261 |
| C4.2 | MgCl$_2$ | 19.6 | 0.020 | 57.2 | 240 |
| C4.3 | MgCl$_2$/MC | 19.6 | 0.322 | 60.4 | 232 |
| 4.4 | MgCl$_2$/PVA | 19.6 | 0.060 | 60.6 | 267 |

As is seen in the table above, the quantity of low molecular mass contaminants entering the latex serum, based on nitrile rubber (COD$_{NBR}$), is greater in the case of the inventive latex coagulation (Example 4.4). The inventively coagulated nitrile rubber therefore has a greater purity than the nitrile rubbers coagulated in accordance with the prior art.

The Mooney viscosities of the dried NBR rubbers were determined before and after hot air storage in accordance with DIN 53 523 at 100° C. [ML 1+4 (100° C.)]. The Mooney values are reported in the dimension of Mooney units, abbreviated to MU.

For hot air ageing (HAA), Mooney sheets were subjected to 48 hours of storage at 100° C. in a convection drying cabinet. The difference in the Mooney viscosities ("SS"=MV2−MV1) after and before HAA is a measure of the Storage Stability of the NBR rubbers. Sufficient storage stability requires a difference in the Mooney viscosities after and before hot air storage of ≤5 MU.

The ash content and the residue on ignition were determined in accordance with DIN 53568, Part 1, at a temperature of 800° C.

TABLE 10

Example series 4
Storage stability and ash content of inventive nitrile rubber
4.4 in comparison with the prior art (C4.1, C4.2 and C4.3)

| | | | ML(1 + 4@100° C.) [MU] | | |
|---|---|---|---|---|---|
| No. | Precipitant | Ash content [% by wt] | MV1 [MU] | MV2 [MU] | SS [MU] |
| C4.1 | NaCl | 0.2 | 43 | 48 | 5 |
| C4.2 | MgCl$_2$ | 0.2 | 43 | 44 | 1 |
| C4.3 | MgCl$_2$/MC | 0.3 | 43 | 45 | 2 |
| 4.4 | MgCl$_2$/PVA | 0.3 | 43 | 45 | 2 |

Table 10 shows that, in the case of inventive latex coagulation, the storage stability of the nitrile rubber is good, as desired (change in Mooney viscosity on 48-hour storage at 100° C. of not more than 5 MU).

On the basis of the nitrile rubbers from Example series 4, mixtures were produced in a 1.5 l laboratory internal mixer, the individual constituents of the mixtures being mixed in the order stated. All of the mixture constituents are related in parts by weight per 100 parts by weight of the nitrile rubber.

TABLE 11

Example series 4
Composition of the rubber mixtures

| Constituents of the mixture | Amount in parts by weight |
|---|---|
| Nitrile rubbers from Example series 4 | 100.0 |
| Stearic acid | 2.0 |

TABLE 11-continued

Example series 4
Composition of the rubber mixtures

| Constituents of the mixture | Amount in parts by weight |
|---|---|
| Zinc oxide | 5.0 |
| Carbon black N 330 | 40.0 |
| Phenol-formaldehyde resin (Plastikator ® FH; Lanxess Deutschland GmbH) | 5.0 |
| N-Cyclohexylbenzothiazylsulphenamide (Vulkacit ® CZ; Lanxess Deutschland GmbH) | 0.9 |
| Sulphur | 1.5 |

The vulcanization behaviour of the mixtures was determined in a rheometer at 160° C. in accordance with DIN 53 529 using the Monsanto rheometer MDR 2000E. The characteristic vulcanization times $t_{10}$ and $t_{90}$ were determined in this way.

In accordance with DIN 53 529, part 3:

$t_{10}$: time at which 10% of the conversion has been achieved
$t_{90}$: time at which 90% of the conversion has been achieved The vulcanized test specimens required for the further measurements were produced by vulcanization at 160° C. in a press under a hydraulic pressure of 120 bar for 30 minutes. The stress at 300% elongation ($\sigma_{300}$), the tensile strength ($\sigma_{max}$) and the elongation at break ($\epsilon_h$) of the vulcanizates were determined by means of a tensile test in accordance with DIN 53504.

TABLE 12

Example series 4
Vulcanizate properties of the nitrile rubber 4.4 produced according to the invention and of Comparative Examples 4.1, 4.2 and 4.3

| | | Vulcanization | | | | Vulcanizate properties | | |
|---|---|---|---|---|---|---|---|---|
| | | MS | | | | | | |
| No. | Precipitant | (120° C.) [min] | $t_{10}$ [sec] | $t_{90}$ [sec] | $t_{90}-t_{10}$ [sec] | $\sigma_{300}$ [MPa] | $\sigma_{max.}$ [MPa] | $\epsilon_b$ [%] |
| V4.1 | NaCl | 49 | 7.5 | 13.2 | 5.7 | 8.1 | 21.9 | 565 |
| V4.2 | MgCl$_2$ | 52 | 8.0 | 13.3 | 5.3 | 8.2 | 23.7 | 608 |
| V4.3 | MgCl$_2$/MC | 55 | 7.9 | 13.9 | 6.0 | 7.7 | 22.7 | 622 |
| 4.4 | MgCl$_2$/PVA | 57 | 7.7 | 13.2 | 5.5 | 8.1 | 22.9 | 598 |

As is seen from the above, the inventively prepared NBR 4.4 has the longest scorch time (MS 5) and therefore has the greatest processing reliability. At the same time, the vulcanization rate ($t_{90}-t_{10}$) is greatest for the inventively prepared NBR (4.4). The other vulcanizate properties of 4.4 are comparable with the latices coagulated using NaCl (4.1) and using MgCl$_2$ (4.2), with $\sigma_{300}$ for NBR 4.4 being significantly better than for NBR 4.3, which was coagulated using methylcellulose.

Example Series 5

Preparation of Nitrile Rubbers for Corrosivity Testing (5.1-5.4: NBR Latex Coagulation with Different Salts and PVA; Separate Addition of Salt and PVA; Heating of the Reaction Mixture Following Salt Addition to Temperatures>80° C.

C5.5: NBR Latex Coagulation without PVA with MgCl$_2$ and Gelatin)

Each of the inventive nitrile rubbers used in Example series 5, viz. 5.1, 5.2, 5.3 and 5.4, was produced with 25 l of latex, using latex A. Latex A, moreover, before the addition of the salt solutions, was diluted with dionized water to solids concentrations in the 10-15% by weight range (see Table 13). In the inventive experiments of this series of experiments, the aqueous solutions of magnesium chloride, or magnesium chloride and PVA, were added separately to the latex. The concentration of the salt solutions was in each case 5% by weight. Addition to the latex was made at 23° C. After the reaction mixture had been heated to temperatures>80° C., the PVA grades indicated in the table were added in the form of dilute aqueous solutions (4% by weight).

Following the end of latex coagulation, the rubber crumb was removed with a sieve and washed under the conditions indicated in the table.

After the end of washing, the rubber crumb was withdrawn with a sieve, subjected to preliminary dewatering in a Welding screw, and dried batchwise in a vacuum drying cabinet at 70° C. to a residual moisture content of <1.5% by weight.

For Comparative example C5.5, no PVA was used for the latex coagulation; instead, an aqueous, gelatin-containing magnesium chloride solution with an MgCl$_2$ content of 5% by weight was employed. The gelatin used was an acid-ashed gelatin (viscosity in 10% strength aqueous solution: 92.1 cP; isoelectric point: 8.7) which prior to latex coagulation was dissolved in the magnesium chloride solution. The other boundary conditions for the latex coagulation and crumb washing were identical to the above description for Example series 5.

TABLE 13

Example series 5: Conditions for latex coagulation

| No. | Latex solids content [% by wt] | PVA grade | Type of salt and amount, based on NBR [% by wt] | Amount of PVA, based on NBR [% by wt] | Crumb washing | | | Chlorine content [ppm] |
|---|---|---|---|---|---|---|---|---|
| | | | | | Type of water | T [° C.] | Time [h] | |
| 5.1 | 14.4 | Mowiol 66-100 | Mg$_2$SO$_4$/1.0 | 1.0 | BW | 90 | 5 | 5 |
| 5.2 | 10.3 | Mowiol 25/140 | MgCl$_2$/0.9 | 0.6 | BW | 90 | 5 | 12 |
| 5.3 | 12.7 | Polyviol W 05/140 | MgCl$_2$/0.9 | 0.5 | BW | 90 | 5 | 21 |
| 5.4 | 13.7 | Mowiol 66-100 | MgCl$_2$/0.9 | 0.7 | BW | 80 | 5 | 23 |
| C5.5 | 14.8 | — | MgCl$_2$/0.7 + 200 ppm gelatin | — | BW | 80 | 5 | 75 |

The corrosive properties of the nitrile rubbers described in Example series 5 were tested by preparation of the mixtures described in Table 14.

TABLE 14

Vulcanization of the nitrile rubbers from Example series 5

| Mixture constituents | Amount in parts by weight |
|---|---|
| Nitrile rubbers from Example series 5 | 100.0 |
| Carbon black N 330 (Statex N 330 from Columbian Carbon) | 40.0 |
| Rhenogran ® BPH-80/L (Rheinchemie Rheinau GmbH) | 2.5 |
| Stearic acid (Edenor C 18 98-100) | 1.0 |
| Polyethylene glycol (Polyglycol 4000 S) | 3.0 |
| Plasticizer (Vulkanol ® OT; Lanxess Deutschland GmbH) | 10 |
| N-Cyclohexylbenzothiazylsulfenamide (Vulkacit ® CZ; Lanxess Deutschland GmbH) | 2.0 |
| Sulphur | 2.0 |
| Zinc oxide | 3.0 |

On the basis of the mixtures specified in Table 14, sheets with a thickness of 2 mm were pressed, and were vulcanized under a pressure of 120 bar at 160° C. for 15 minutes. Sealing rings (external diameter: 38 mm; internal diameter: 20 mm) were punched from the vulcanized sheets.

For corrosion testing, the sealing rings were clamped between two sand-blasted aluminium plates (dimensions: 50×50×2 mm) and stored in a controlled-climate cabinet at 80% relative atmospheric humidity and at 70° C. for 6 weeks. For all of the manual operations, fresh fabric gloves were worn in order to prevent the samples being contaminated by perspiration from the skin. As a reference, a sand-blasted aluminium plate was stored under the same conditions.

Seal corrosivity was evaluated by visual assessment of the aluminium plates, using a ratings scale from 1 to 4.

The evaluation scale employed is illustrated, purely by way of example, by means of the figures.

In summary, the experiment detailed the discoloration of the sealing ring. A sealing ring with a rating of 2, 3 or 4 is entirely suitable for this practice since there are no signs of deposits or corrosion. A sealing ring with a rating of 5 shows deposits and distinct corrosion and, for use in practice, a sealing ring with a rating of 5 is limited in use.

The inventive nitrile rubber samples of Experiments 5.1-5.4 and also of Comparative experiment C5.5 were subjected, analogously, to a visual evaluation. The result is shown in Table 15.

TABLE 15

Example series 5
Evaluation of the sealing corrosivity of the nitrile rubbers

| No. | Polyvinyl acetate used | Type of salt/ amount | Amount of PVA, based on NBR [% by wt] | Chlorine content [ppm] | Sealing corrosivity |
|---|---|---|---|---|---|
| 5.1 | Mowiol 66-100 | $Mg_2SO_4$/1.0 | 1.0 | 5 | 1.5 |
| 5.2 | Mowiol 26/88 | $MgCl_2$/0.9 | 0.6 | 12 | 1.5 |
| 5.3 | Polyviol W 30/240 | $MgCl_2$/0.9 | 0.5 | 21 | 2.5 |
| 5.4 | Mowiol 66-100 | $MgCl_2$/0.9 | 0.7 | 23 | 2 |
| C5.5 | — | $MgCl_2$/0.7 + 200 ppm gelatin | — | 75 | 5 |

Table 15 shows that, on the basis of the inventively prepared nitrile rubbers of Example series 5 (5.1-5.4) with chlorine contents of 5 to 23 ppm, vulcanizates are obtained that have no significantly perceptible metal corrosivity. All of the inventive nitrile rubbers of Example series 5 are suitable for the production of sealing rings with low metal corrosivity. In contrast, the use of a non-inventive nitrile rubber (C5.5), whose chlorine content is too high, results in sealing rings exhibiting considerable metal corrosivity.

The present invention has been described with reference to specific details of particular embodiments thereof. It is not intended that such details be regarded as limitations upon the scope of the invention except insofar as and to the extent that they are included in the accompanying claims.

As used in this specification and the appended claims, the singular forms "a," "an," and "the" include plural referents unless the content clearly dictates otherwise.

What is claimed is:

1. A process for producing nitrile rubbers by emulsion polymerization of at least one α,β-unsaturated nitrile, at least one conjugated diene and optionally one or more further copolymerizable monomers in the presence of a molecular weight regulator, with the latex which is obtained in the polymerization and contains the nitrile rubber being subjected to coagulation and the coagulated nitrile rubber subsequently being washed, characterized in that
   (i) the latex obtained in the emulsion polymerization has a pH of at least 6 before the coagulation,
   (ii) the coagulation of the latex is carried out using at least one salt of a mono-, di- or trivalent metal, which is optionally a chloride, as precipitant,
   (iii) the coagulation of the latex is carried out in the presence of polyvinyl acetate, which is optionally partially or fully hydrolysed, as coprecpitant, and
   (iv) the coagulation of the latex and/or the work-up of the coagulated latex is carried out using water containing chloride Ions if the salt of mono-, di- or trivalent metal (i) is not a chloride.

2. The process according to claim 1, wherein at least one alkyl thiol which contains 12-16 carbon atoms and at least three tertiary carbon atoms, with the sulphur being bound to one of these tertiary carbon atoms, is used as molecular weight regulator.

3. The process according to claim 1, wherein the emulsion polymerization is carried out batchwise or continuously in a cascade of stirred vessels.

4. The process according to claim 1, wherein one or more ageing inhibitors as added to the latex containing the nitrile rubber before or during coagulation.

5. The process according to claim 1, wherein magnesium chloride, magnesium sulphate or magnesium nitrate is used as precipitant for coagulation of the latex.

6. The process according to claim 1, wherein from 0.1 to 20% by weight, of at least one salt, based on nitrile rubber, is used for the coagulation of the latex.

7. The process according to claim 1, wherein the concentration of the salt solution of the salt is from 0.3 to 30% by weight.

8. The process according to claim 1, wherein the latex used for the coagulation has a solids concentration in the range from 1% to 40% by weight.

9. The process according to claim 1, wherein the washing of the coagulated nitrile rubber is carried out at a temperature in the range from 15 to 90° C.

10. The process according to claim 1, wherein the optionally partly or fully hydrolysed polyvinyl acetate used as coprecipitant has a viscosity in the range from 0.5 to 200 cP, and has an ester number in the range from 0 to 240.

11. The process according to claim 1, wherein the optionally partly or fully hydrolysed polyvinyl acetate used as coprecipitant is used in the form of an aqueous solution which possesses a concentration of 0.1% to 10%, by weight, based on the nitrile rubber.

12. The process according to claim 1, wherein the nitrile rubber obtained is subsequently subjected to either (i) only a metathesis reaction or (ii) a metathesis reaction and a subsequent hydrogenation or (iii) only a hydrogenation.

13. Optionally hydrogenated nitrile rubbers obtained by the process according to claim 12, the optionally hydrogenated nitrile rubbers having a chlorine content in the range from 4 to 25 ppm, based on the optionally hydrogenated nitrile rubber.

14. A vulcanizable mixture containing at least one optionally hydrogenated nitrile rubber according to claim 13, at least one crosslinker and optionally further additives.

15. The process for producing a vulcanizable mixture according to claim 14 comprising the steps of mixing the at least one optionally hydrogenated nitrile rubber, the at least one crosslinker and optionally further additives.

16. The process for producing moldings wherein a vulcanizable mixture according to claim 14 is vulcanized in a shaping process.

17. A moulding obtained by the process according to claim 16.

18. The moulding according to claim 17, characterized in that it is a seal, a cap, a hose, or a diaphragm.

19. The moulding according to claim 18, characterized in that it is an O-ring seal, a flat seal, a corrugated sealing ring, a sealing sleeve, a sealing cap, an oil cooler hose, a servo control hose, an air conditioner hose, a thermal insulation hose, a diaphragm for hydro bearings or a diaphragm for a diaphragm pump.

20. A vulcanizable mixture containing at least one nitrile rubber obtained by the process according to claim 1, at least one crosslinker, and optionally further additives, wherein the nitrile rubber has a chlorine content in the range from 4 to 25 ppm, based on the nitrile rubber.

21. A process for producing a vulcanizable mixture according to claim 20 by mixing the at least one nitrile rubber, the at least one crosslinker and optionally further additives.

22. A process for producing moldings wherein a vulcanizable mixture according to claim 20 is vulcanized in a shaping process.

23. A moulding obtained by the process to claim 22.

24. The moulding according to claim 23, characterized in that it is a seal, a cap, a hose or a diaphragm.

25. The moulding according to claim 24, characterized in that it is an O-ring seal, a flat seal, a corrugated sealing ring, a sealing sleeve, a sealing cap, an oil cooler hose, a servo control hose, an air conditioner hose, a thermal insulation hose, a diaphragm for hydro bearings or diaphragm for a diaphragm pump.

* * * * *